US012328273B2

(12) United States Patent
Nam et al.

(10) Patent No.: US 12,328,273 B2
(45) Date of Patent: Jun. 10, 2025

(54) CODE BLOCK-BASED RESOURCE MAPPING FOR TRANSMISSIONS WITH DATA-MODULATED DEMODULATION REFERENCE SIGNALS

(71) Applicant: QUALCOMM Incorporated, San Diego, CA (US)

(72) Inventors: Wooseok Nam, San Diego, CA (US); Tao Luo, San Diego, CA (US); Juan Montojo, San Diego, CA (US); Jing Sun, San Diego, CA (US); Xiaoxia Zhang, San Diego, CA (US); Zhifei Fan, San Diego, CA (US); Ahmed Abdelaziz Ibrahim Abdelaziz Zewail, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/302,815

(22) Filed: May 12, 2021

(65) Prior Publication Data

US 2021/0359810 A1 Nov. 18, 2021

Related U.S. Application Data

(60) Provisional application No. 63/024,005, filed on May 13, 2020.

(51) Int. Cl.
*H04L 5/00* (2006.01)
*H04L 1/1812* (2023.01)
*H04L 25/02* (2006.01)

(52) U.S. Cl.
CPC .......... *H04L 5/0048* (2013.01); *H04L 1/1812* (2013.01); *H04L 25/0228* (2013.01)

(58) Field of Classification Search
None
See application file for complete search history.

(56) References Cited

U.S. PATENT DOCUMENTS

| 10,651,967 B1* | 5/2020 | Zavurov | H04L 27/0008 |
| 2006/0153227 A1* | 7/2006 | Hwang | H04L 5/0094 370/465 |

(Continued)

FOREIGN PATENT DOCUMENTS

| CN | 106160990 A | * 11/2016 | ........... H04L 5/0051 |
| CN | 110493156 A | * 11/2019 | ......... H04L 27/2602 |

(Continued)

OTHER PUBLICATIONS

International Search Report and Written Opinion—PCT/US2021/070550—ISA/EPO—Oct. 28, 2021.

(Continued)

*Primary Examiner* — Andrew C Oh
(74) *Attorney, Agent, or Firm* — Harrity & Harrity, LLP

(57) ABSTRACT

Various aspects of the present disclosure generally relate to wireless communication. In some aspects, a wireless communication device may map a code block to resources, of a physical shared channel, that are allocated for data-modulated demodulation reference signals (DMRSs) in which each of the resources carries both at least a portion of a DMRS sequence and data. The wireless communication device may transmit a communication, via the physical shared channel, that includes the code block that is mapped to the resources that are allocated for the data-modulated DMRSs. Numerous other aspects are provided.

28 Claims, 10 Drawing Sheets

(56) References Cited

U.S. PATENT DOCUMENTS

| | | | |
|---|---|---|---|
| 2008/0232325 A1* | 9/2008 | Mehta | H04B 7/0691 370/332 |
| 2009/0268685 A1* | 10/2009 | Chen | H04W 72/04 370/329 |
| 2010/0165931 A1* | 7/2010 | Nimbalker | H04L 1/1671 370/329 |
| 2010/0290559 A1* | 11/2010 | Futagi | H04L 1/0016 375/295 |
| 2011/0039568 A1* | 2/2011 | Zhang | H04W 52/50 455/452.1 |
| 2012/0269140 A1* | 10/2012 | Nam | H04B 7/024 370/329 |
| 2012/0275415 A1* | 11/2012 | Wang | H04L 1/0061 370/329 |
| 2012/0288025 A1* | 11/2012 | Ogawa | H04L 1/1893 375/267 |
| 2013/0039297 A1* | 2/2013 | Wang | H04W 76/25 370/328 |
| 2013/0083719 A1* | 4/2013 | Seo | H04B 17/24 370/312 |
| 2013/0229958 A1* | 9/2013 | Sagae | H04L 1/1854 370/281 |
| 2013/0336252 A1* | 12/2013 | Hsieh | H04W 72/23 370/329 |
| 2014/0301311 A1* | 10/2014 | Montojo | H04L 1/007 370/329 |
| 2014/0313997 A1* | 10/2014 | Xu | H04L 27/2613 370/329 |
| 2015/0245326 A1* | 8/2015 | Rune | H04L 1/1671 370/329 |
| 2015/0282124 A1* | 10/2015 | Miao | H04L 25/0224 455/450 |
| 2015/0334683 A1* | 11/2015 | Guo | H04L 5/0094 370/329 |
| 2016/0192385 A1* | 6/2016 | Tooher | H04L 5/0051 370/336 |
| 2016/0227521 A1* | 8/2016 | Han | H04W 72/0453 |
| 2016/0254869 A1* | 9/2016 | Wen | H04L 5/0073 370/330 |
| 2017/0288835 A1* | 10/2017 | Kim | H04L 5/0048 |
| 2017/0366377 A1* | 12/2017 | Papasakellariou | H04L 5/0053 |
| 2018/0062711 A1* | 3/2018 | Mizusawa | H04B 7/0452 |
| 2018/0083824 A1* | 3/2018 | Yang | H04L 27/3405 |
| 2018/0091207 A1* | 3/2018 | Kakishima | H04L 25/03343 |
| 2018/0175987 A1* | 6/2018 | Shao | H04L 5/0053 |
| 2018/0198594 A1* | 7/2018 | Tiirola | H04L 5/0051 |
| 2018/0269898 A1* | 9/2018 | Sun | H04L 1/1893 |
| 2018/0270807 A1* | 9/2018 | Salem | H04W 72/0446 |
| 2018/0278375 A1* | 9/2018 | Li | H04L 1/1896 |
| 2018/0309489 A1* | 10/2018 | Hosseini | H04L 5/0051 |
| 2018/0323849 A1* | 11/2018 | Park | H04L 5/14 |
| 2018/0375561 A1* | 12/2018 | Park | H04B 7/0456 |
| 2018/0375634 A1* | 12/2018 | Sun | H04L 1/1812 |
| 2019/0045533 A1* | 2/2019 | Chatterjee | H04W 72/23 |
| 2019/0159181 A1* | 5/2019 | Manolakos | H04W 72/23 |
| 2019/0165826 A1* | 5/2019 | Goto | H04L 27/2607 |
| 2019/0166625 A1* | 5/2019 | Nam | H04W 74/0816 |
| 2019/0182006 A1* | 6/2019 | Xiong | H04L 1/1861 |
| 2019/0223209 A1* | 7/2019 | Li | H04L 5/0053 |
| 2019/0229873 A1* | 7/2019 | Enescu | H04W 24/10 |
| 2019/0268795 A1* | 8/2019 | Wu | H04W 24/10 |
| 2019/0288795 A1* | 9/2019 | Ge | H04L 1/0071 |
| 2019/0305908 A1* | 10/2019 | Lee | H04L 5/0051 |
| 2019/0342061 A1* | 11/2019 | Kim | H04L 5/10 |
| 2019/0373585 A1* | 12/2019 | Suzuki | H04L 1/0003 |
| 2020/0028627 A1* | 1/2020 | Andersson | H04L 1/1614 |
| 2020/0044784 A1* | 2/2020 | Yang | H04L 5/0053 |
| 2020/0059341 A1* | 2/2020 | Zhang | H04L 1/1825 |
| 2020/0059905 A1* | 2/2020 | Tang | H04B 7/0486 |
| 2020/0059935 A1* | 2/2020 | Qian | H04W 72/23 |
| 2020/0068544 A1* | 2/2020 | Xue | H04W 72/21 |
| 2020/0106584 A1* | 4/2020 | Jiang | H04L 5/0053 |
| 2020/0107300 A1* | 4/2020 | Kwak | H04L 5/0094 |
| 2020/0112357 A1* | 4/2020 | Fakoorian | H04L 1/0009 |
| 2020/0195386 A1* | 6/2020 | Marinier | H04L 5/0091 |
| 2020/0235886 A1* | 7/2020 | Salim | H04L 5/0048 |
| 2020/0244499 A1* | 7/2020 | Yoshioka | H04L 1/1861 |
| 2020/0252948 A1* | 8/2020 | Cui | H04W 72/23 |
| 2020/0260499 A1* | 8/2020 | Sarkis | H04W 74/004 |
| 2020/0322839 A1* | 10/2020 | Nguyen | H04W 4/06 |
| 2020/0336274 A1* | 10/2020 | Yoshioka | H04L 5/0051 |
| 2020/0383091 A1* | 12/2020 | Park | H04W 72/23 |
| 2021/0092718 A1* | 3/2021 | Chen | H04W 72/23 |
| 2021/0112538 A1* | 4/2021 | Kim | H04L 1/04 |
| 2021/0126759 A1* | 4/2021 | Chen | H04L 5/0058 |
| 2021/0144700 A1* | 5/2021 | Lee | H04L 5/001 |
| 2021/0410097 A1* | 12/2021 | Munier | H04L 5/0053 |
| 2022/0123885 A1* | 4/2022 | Shin | H04W 72/0446 |
| 2022/0150981 A1* | 5/2022 | Lin | H04W 74/0841 |
| 2022/0407746 A1* | 12/2022 | Zhou | H04L 27/2657 |

FOREIGN PATENT DOCUMENTS

| | | | |
|---|---|---|---|
| CN | 111835389 A * | 10/2020 | H04B 7/0452 |
| CN | 111294170 B * | 9/2021 | H04L 5/0048 |
| CN | 110785956 B * | 3/2022 | H04B 7/0617 |
| KR | 20180108452 A * | 10/2018 | H04L 1/1861 |
| WO | WO-2010150802 A1 * | 12/2010 | H04B 7/0678 |
| WO | WO-2011038780 A1 * | 4/2011 | H04W 72/1278 |
| WO | WO-2015147442 A1 * | 10/2015 | H04L 1/0003 |
| WO | WO-2017167156 A1 * | 10/2017 | |
| WO | WO-2018128873 A1 * | 7/2018 | H04L 1/0008 |
| WO | WO-2018174555 A1 * | 9/2018 | H04L 1/04 |
| WO | WO-2020216005 A1 * | 10/2020 | H04W 74/004 |
| WO | WO-2021214921 A1 * | 10/2021 | H04L 1/0025 |

OTHER PUBLICATIONS

Kim J., et al., "Performance Analysis for DM-RS Mapping in a High Speed Train System", Sep. 29, 2018 (Sep. 29, 2018), Advances in Databases and Information Systems, [Lecture Notes in Computer Science; Lect.Notes Computer], Springer International Publishing, CHAM, pp. 371-380, XP047497810, ISBN: 978-3-319-10403-4, retrieved on Sep. 29, 2018] Sections 1-3, figures 2.3.

Lee J., et al., "Consideration on Physical Layer Aspects of NR Systems in HST Scenarios", 2019 IEEE 90th Vehicular Technology Conference (VTC2019-FALL), IEEE, Sep. 22, 2019 (Sep. 22, 2019), 5 Pages, XP033648426, DOI: 10.1109/VTCFALL.2019. 889139 [Retrieved on Nov. 4, 2019] Sections I-IV, figures 1-5.

Partial International Search Report—PCT/US2021/070550—ISA/EPO—Aug. 26, 2021.

* cited by examiner

CODE BLOCK-BASED RESOURCE MAPPING FOR TRANSMISSIONS WITH DATA-MODULATED DEMODULATION REFERENCE SIGNALS

CROSS-REFERENCE TO RELATED APPLICATION

This Patent Application claims priority to Provisional Patent Application No. 63/024,005, filed on May 13, 2020, entitled "CODE BLOCK-BASED RESOURCE MAPPING FOR TRANSMISSIONS WITH DATA-MODULATED DEMODULATION REFERENCE SIGNALS," and assigned to the assignee hereof. The disclosure of the prior Application is considered part of and is incorporated by reference in this Patent Application.

FIELD OF THE DISCLOSURE

Aspects of the present disclosure generally relate to wireless communication and specifically, to techniques and apparatuses for code block-based resource mapping for transmissions with data-modulated demodulation reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some communication networks, a transmitter device may include demodulation reference signals (DMRSs) in a transmitted communication to improve channel estimation by a receiver device. In some scenarios (for example, in a high speed scenario), the transmitter device may transmit DMRSs on one symbol of the transmitted communication (for example, a baseline DMRS pattern) or on two or more symbols of the transmitted communication (for example, a baseline DMRS with an additional DMRS pattern). However, when DMRSs are transmitted on symbols of a communication, the DMRSs may increase overhead and reduce throughput of the communication.

SUMMARY

In some aspects, a method of wireless communication, performed by a wireless communication device, may include mapping a code block to resources, of a physical shared channel, that are allocated for data-modulated demodulation reference signals (DMRSs) in which each of the resources carries both at least a portion of a DMRS sequence and data. The method further includes transmitting a communication, via the physical shared channel, that includes the code block that is mapped to resources that are allocated for the data-modulated DMRSs.

In some aspects, a method of wireless communication, performed by a wireless communication device, may include determining a mapping of a code block to resources, of a physical shared channel, that are allocated for the data-modulated DMRSs in which each of the resources carries both at least a portion of a DMRS sequence and data. The method further includes receiving a communication, via the physical shared channel, that includes the code block that is mapped to resources that are allocated for the data-modulated DMRSs.

In some aspects, a wireless communication device for wireless communication may include a memory and one or more processors coupled to the memory. The one or more processors may be configured to map a code block to resources, of a physical shared channel, that are allocated for data-modulated DMRSs in which each of the resources carries both at least a portion of a DMRS sequence and data. The memory and the one or more processors may be further configured to transmit a communication, via the physical shared channel, that includes the code block that is mapped to resources that are allocated for the data-modulated DMRSs.

In some aspects, a wireless communication device for wireless communication may include a memory and one or more processors coupled to the memory. The one or more processors may be configured to determine a mapping of a code block to resources, of a physical shared channel, that are allocated for the data-modulated DMRSs in which each of the resources carries both at least a portion of a DMRS sequence and data. The memory and the one or more processors may be further configured to receive a communication, via the physical shared channel, that includes the code block that is mapped to resources that are allocated for the data-modulated DMRSs.

In some aspects, a non-transitory computer-readable medium may store one or more instructions for wireless communication. The one or more instructions, when executed by one or more processors of a wireless communication device, may cause the one or more processors to map a code block to resources, of a physical shared channel, that are allocated for data-modulated DMRSs in which each of the resources carries both at least a portion of a DMRS sequence and data. The one or more instructions, when executed by one or more processors of a wireless communication device, may further cause the one or more processors to transmit a communication, via the physical shared channel, that includes the code block that is mapped to resources that are allocated for the data-modulated DMRSs.

In some aspects, a non-transitory computer-readable medium may store one or more instructions for wireless communication. The one or more instructions, when executed by one or more processors of a wireless communication device, may cause the one or more processors to determine a mapping of a code block to resources, of a physical shared channel, that are allocated for the data-modulated DMRSs in which each of the resources carries both at least a portion of a DMRS sequence and data. The one or more instructions, when executed by one or more processors of a wireless communication device, may further cause the one or more processors to receive a communication, via the physical shared channel, that includes the code block that is mapped to resources that are allocated for the data-modulated DMRSs.

In some aspects, an apparatus for wireless communication may include means for mapping a code block to resources, of a physical shared channel, that are allocated for data-modulated DMRSs in which each of the resources carries both at least a portion of a DMRS sequence and data. The apparatus for wireless communication may further include means for transmitting a communication, via the physical shared channel, that includes the code block that is mapped to resources that are allocated for the data-modulated DMRSs.

In some aspects, an apparatus for wireless communication may include means for determining a mapping of a code block to resources, of a physical shared channel, that are allocated for the data-modulated DMRSs in which each of the resources carries both at least a portion of a DMRS sequence and data. The apparatus for wireless communication may further include means for receiving a communication, via the physical shared channel, that includes the code block that is mapped to resources that are allocated for the data-modulated DMRSs.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
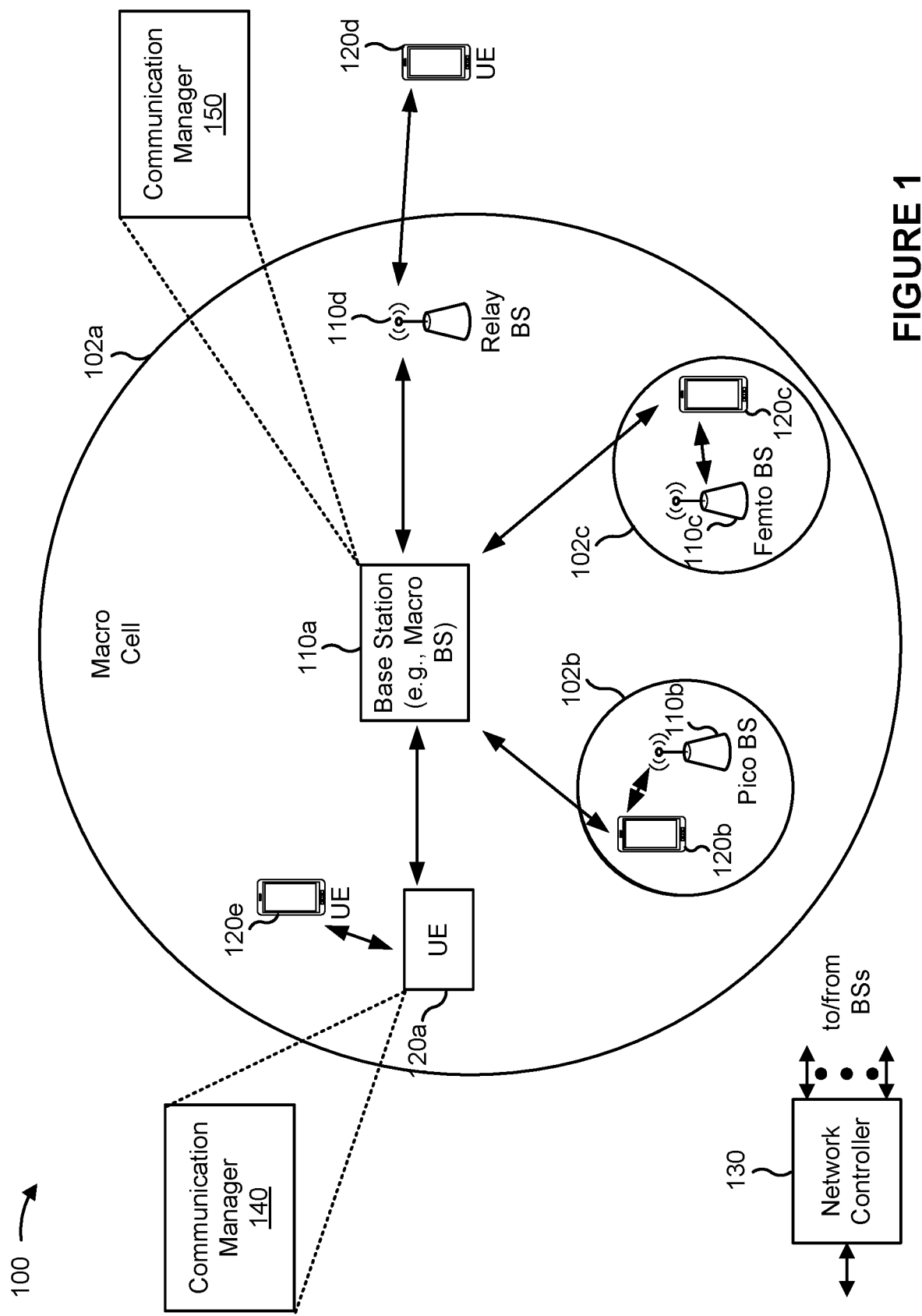
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to mapping a code block to resources, of a physical shared channel, that are allocated for data-modulated demodulation reference signals (DMRSs). Some aspects more specifically relate to mapping one or more code blocks to only those resources that are allocated for data-modulated DMRSs. A resource that is allocated for a data-modulated DMRS includes at least a portion of a DMRS sequence that is multiplexed with data using modulation. In some aspects, one or more additional code blocks are mapped to only resources that are allocated for only data. The one or more code blocks mapped to only those resources that are allocated for data-modulated DMRSs and the one or more additional code blocks may be associated with different transmission parameters, such as modulation and coding schemes (MCSs), cyclic redundancy checks, or feedback indications, among other examples.

Particular aspects of the subject matter described in this disclosure can be implemented to realize one or more of the following potential advantages. In some examples, the described techniques can be used to allow a receiver device to attempt to decode the data-modulated DMRSs of a communication independently from attempting to decode data signals that are mapped to other code blocks of the communication. In this way, the receiver device may attempt to decode the data-modulated DMRSs before attempting to decode the data signals that are mapped to other code blocks of the communication. This then enables the receiver device to use the decoded data-modulated DMRSs to estimate the physical shared channel before attempting to decode the data signals of the communication.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). ABS for a macro cell may be referred to as a macro BS. A BS for a pico cell may be referred to as a pico BS. ABS for a femto cell may be referred to as a femto BS or a home BS. ABS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment. UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

In some aspects, the wireless communication device (for example, a transmitter device) may include a communication manager 140 or 150 (for example, communication manager 140 if the wireless communication device comprises a UE or communication manager 150 if the wireless communication device comprises a base station). As described in more detail elsewhere herein, the communication manager 140 or 150 may map a code block to resources, of a physical shared channel, that are allocated for data-modulated DMRSs in which each of the resources carries both at least a portion of a DMRS sequence and data; and transmit a communication, via the physical shared channel, that includes the code block that is mapped to the resources that are allocated for the data-modulated DMRSs. Additionally or alternatively, the communication manager 140 or 150 may perform one or more other operations described herein.

In some aspects, the wireless communication device (for example, a receiver device) may include a communication manager 140 or 150. As described in more detail elsewhere herein, the communication manager 140 or 150 may determine a mapping of a code block to resources, of a physical shared channel, that are allocated for data-modulated DMRSs in which each of the resources carries both at least a portion of a DMRS sequence and data; and receive a communication, via the physical shared channel, that includes the code block that is mapped to the resources that are allocated for the data-modulated DMRSs. Additionally or alternatively, the communication manager 140 or 150 may perform one or more other operations described herein.

Figure 2:
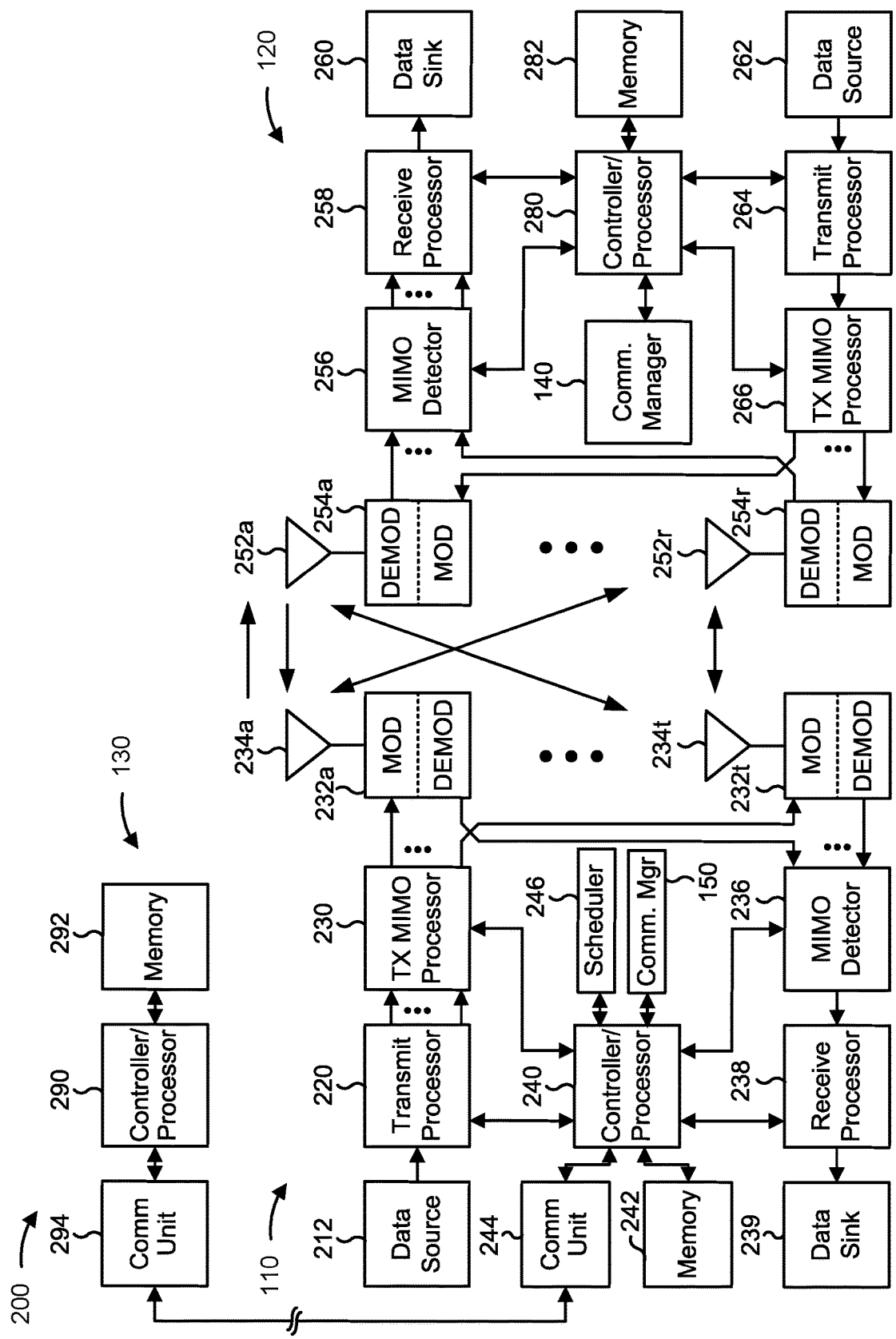
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234*a* through 234*t*, and UE 120 may be equipped with R antennas 252*a* through 252*r*, where in general T≥1 and R≥1. At base station 110, a transmit processor 220 may receive data from a data source 212 for one or more UEs, select one or more MCSs for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with code block-based resource mapping for transmissions with data-modulated demodulation reference signals, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some aspects, executing instructions may include running the instructions, converting the instructions, compiling the instructions, or interpreting the instructions, among other examples.

In some aspects, the wireless communication device includes means for mapping a code block to resources, of a physical shared channel, that are allocated for data-modulated DMRSs in which each of the resources carries both at least a portion of a DMRS sequence and data; or means for transmitting a communication, via the physical shared channel, that includes the code block that is mapped to the resources that are allocated for the data-modulated DMRSs. In some aspects, the means for the wireless communication device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the wireless communication device includes means for determining a mapping of a code block to resources, of a physical shared channel, that are allocated for data-modulated DMRSs in which each of the resources carries both at least a portion of a DMRS sequence and data; or means for receiving a communication, via the physical shared channel, that includes the code block that is mapped to the resources that are allocated for the data-modulated DMRSs. In some aspects, the means for the wireless communication device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some communication networks, a transmitting wireless communication device may include DMRSs in a transmitted communication to improve channel estimation by a receiving wireless communication device. The transmitting wireless communication device may transmit DMRSs on one symbol of the transmitted communication (for example, a baseline DMRS pattern) or on two or more symbols of the transmitted communication (for example, a baseline DMRS with additional DMRSs pattern). However, when transmitting DMRSs on symbols of a communication, the DMRSs may increase overhead and reduce throughput of the communication.

To reduce overhead of a transmitted communication having a relatively high number (for example, more than the baseline pattern) of DMRSs to improve channel estimation by a receiving wireless communication device, the transmitted communication may include data that is multiplexed with the DMRSs (data-modulated DMRSs) on one or more resources that carry the DMRSs. To use the data-modulated DMRSs, the receiving wireless communication device may need to decode the data-modulated DMRSs before using the data-modulated DMRSs for channel estimation. However, because the data-modulated DMRSs may be spaced in time (for example, on different symbols), the receiving wireless communication device may attempt to decode the data-modulated DMRSs while attempting to decode data transmitted on resources within or near a symbol that carries the data-modulated DMRSs.

In some aspects described herein, a transmitting wireless communication device (for example, a UE, a base station, or another device) may map one or more code blocks to resources, of a physical shared channel, that are allocated for data-modulated DMRSs. In other words, the transmitter device may map resources that are allocated for data-modulated DMRSs to a code block so that a receiving wireless communication device (for example, a UE, a base station, or another device) may attempt to decode the data-modulated DMRSs independently from attempting to decode data signals that are mapped to other code blocks of the communication. In this way, the receiving wireless communication device may attempt to decode the data-modulated DMRSs before attempting to decode the data signals that are mapped to other code blocks of the communication. In this way, the receiving wireless communication device may use decoded data-modulated DMRSs to estimate the physical shared channel before attempting to decode the data signals of the communication.

In this way, the transmitter device may conserve computing, network, or communication resources by configuring the communication so that the receiving wireless communication device may efficiently use data-modulated DMRSs to estimate a channel and to improve throughput of the communication. Increasing throughput of the transmitted communication may reduce a number of communications to transmit buffered data, a number of resources used to transmit the communication, or provide other benefits.

FIGS. 3A-3D are diagrams illustrating examples of reference signal configurations in accordance with the present disclosure. As shown, a shared channel (for example, a physical downlink shared channel (PDSCH) or a physical uplink shared channel (PUSCH)) may include a number of subchannels (for example, 12 subchannels) and a number of symbols (for example, 14 symbols). Also shown, a control channel (for example, a physical downlink control channel (PDCCH) or a physical uplink control channel (PUCCH)) may include a same number of subchannels as the shared channel and a number of symbols (for example, 2 symbols).

A transmitter device (for example, a base station or a UE) may transmit, and a receiver device (for example, a UE or a base station) may receive (for example, attempt to receive) a communication over the shared channel that include phase tracking reference signals (PTRSs), DMRSs, or data.

A DMRS may carry information used to estimate a radio channel for demodulation of an associated physical channel (for example, PDCCH, PDSCH, PUCCH, or PUSCH). A design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. DMRSs may be used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

Figure 3A:
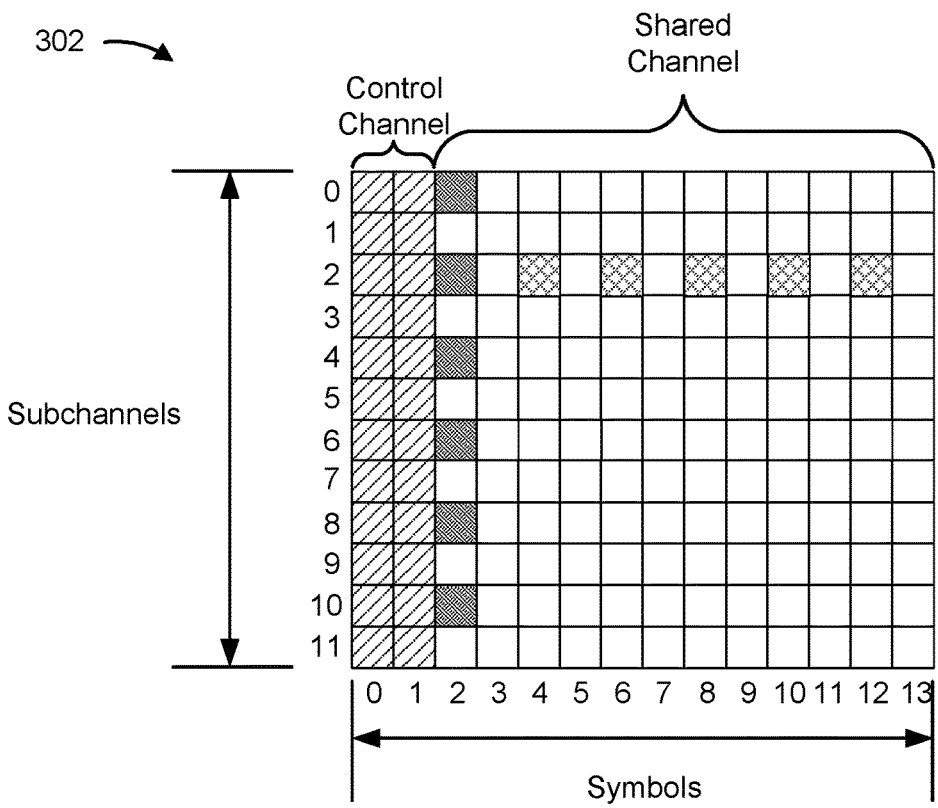
FIGS. 3A-3D are diagrams illustrating examples of reference signal configurations in accordance with the present disclosure.
Figure 3B:
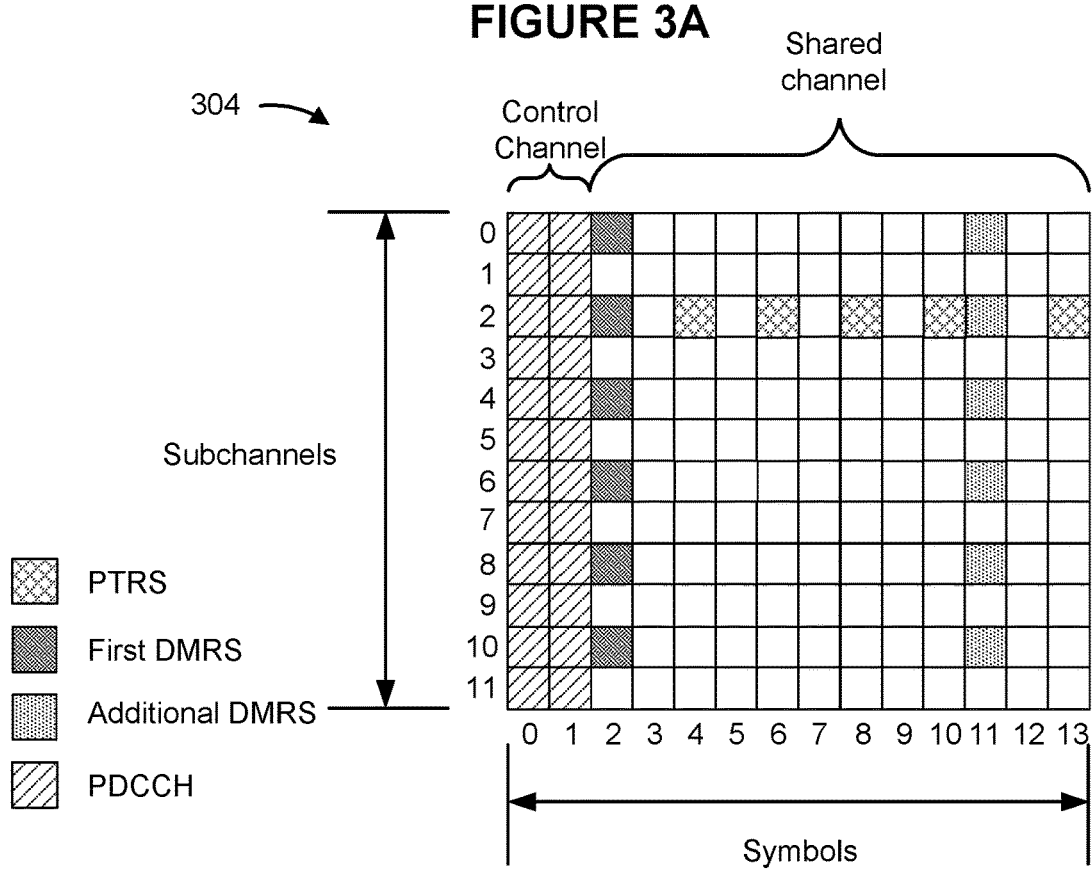
Figure 3C:
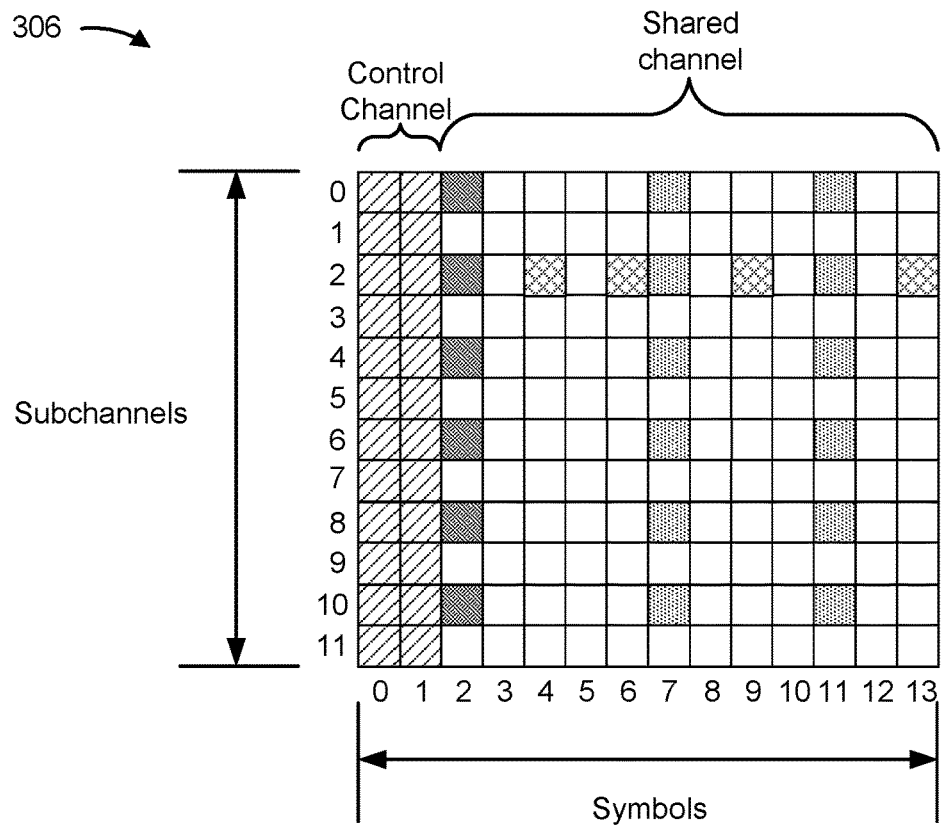
Figure 3D:
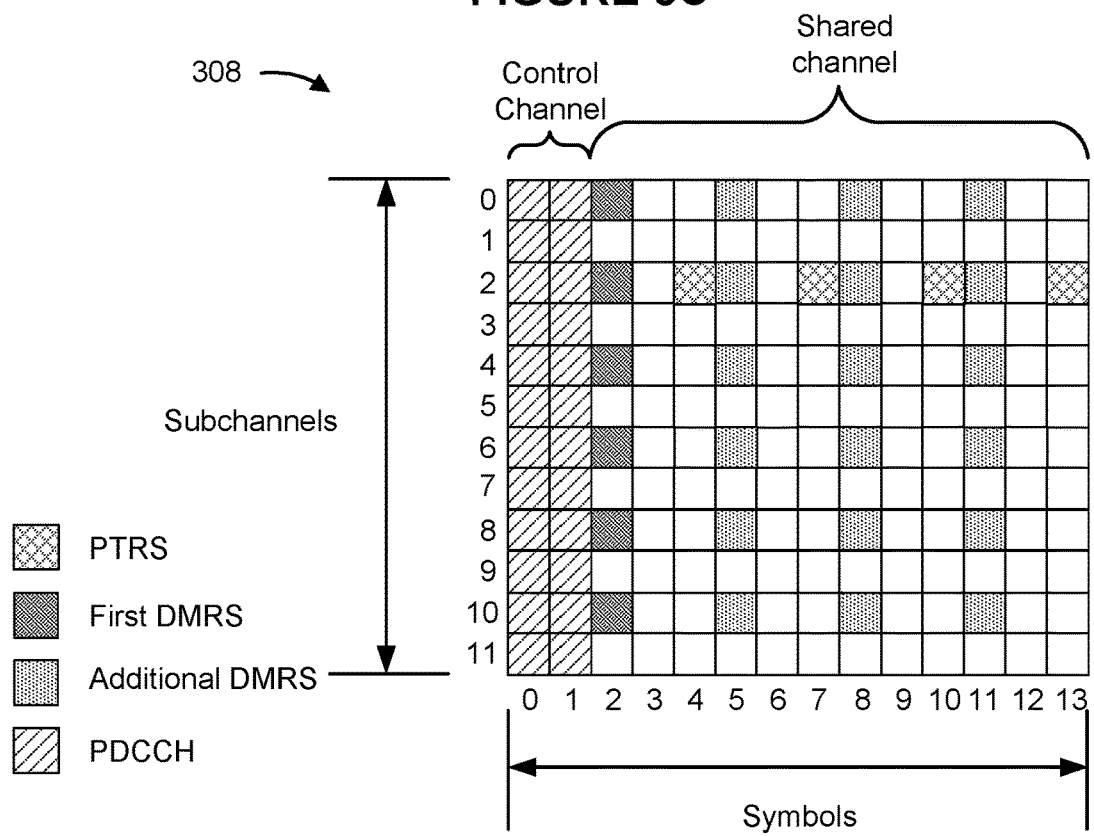

As shown in FIG. 3A, and by configuration 302, a shared channel may be configured with DMRSs in only one symbol and with PTRSs distributed over 5 symbols. As shown in FIG. 3B, and by configuration 304, a shared channel may be configured with DMRSs in two symbols and with PTRSs distributed over 5 symbols. As shown in FIG. 3C, and by configuration 306, a shared channel may be configured with DMRSs in three symbols and with PTRSs distributed over 4 symbols. As shown in FIG. 3D, and by configuration 308, a shared channel may be configured with DMRSs in four symbols and with PTRSs distributed over 4 symbols.

In some communication networks, a transmitting wireless communication device may include DMRSs in a transmitted communication to improve channel estimation by a receiving wireless communication device. The transmitting wireless communication device may transmit DMRSs on one symbol of the transmitted communication (for example, a baseline DMRS pattern) or on two or more symbols of the transmitted communication (for example, a baseline DMRS with additional DMRSs pattern). However, when transmitting DMRSs on symbols of a communication, the DMRSs may increase overhead and reduce throughput of the communication.

To reduce overhead of a transmitted communication having a relatively high number (for example, more than the baseline pattern) of DMRSs to improve channel estimation by a receiving wireless communication device, the transmitted communication may include data that is multiplexed with the DMRSs (data-modulated DMRSs) on one or more resources that carry the DMRSs. To use the data-modulated DMRSs, the receiver device may need to decode the data-modulated DMRSs before using the data-modulated DMRSs for channel estimation. However, because the data-modulated DMRSs may be spaced in time (for example, on different symbols), the receiver device may attempt to decode the data-modulated DMRSs while attempting to decode data transmitted on resources within or near a symbol that carries the data-modulated DMRSs.

Various aspects relate generally to a transmitting wireless communication device (for example, a UE, a base station, or another device) that maps one or more code blocks to resources (for example, a resource element, a set of resource elements, or a symbol, among other examples) of a physical shared channel that are allocated for data-modulated DMRSs. Some aspects more specifically relate to the transmitter device mapping the resources that are allocated for data-modulated DMRSs to a code block that does not include resources that are allocated for only data so that a receiving wireless communication device (for example, a UE, a base station, or another device) may attempt to decode the data-modulated DMRSs independently from attempting to decode data signals that are mapped to other code blocks of the communication.

Particular aspects of the subject matter described in this disclosure can be implemented to realize one or more of the following potential advantages. In some examples, the described techniques can be used to allow a receiver device to attempt to decode the data-modulated DMRSs before attempting to decode the data signals that are mapped to other code blocks of the communication. In some examples, the described techniques can be used to allow a receiver device to use decoded data-modulated DMRSs to estimate the physical shared channel before attempting to decode the data signals of the communication. In this way, the transmitter device may conserve computing, network, or communication resources by configuring the communication so that the receiving wireless communication device may efficiently use data-modulated DMRSs to estimate a channel and to improve throughput of the communication. Increasing throughput of the transmitted communication may reduce a number of communications to transmit buffered data, a number of resources used to transmit the communication, or provide other benefits.

Figure 4:
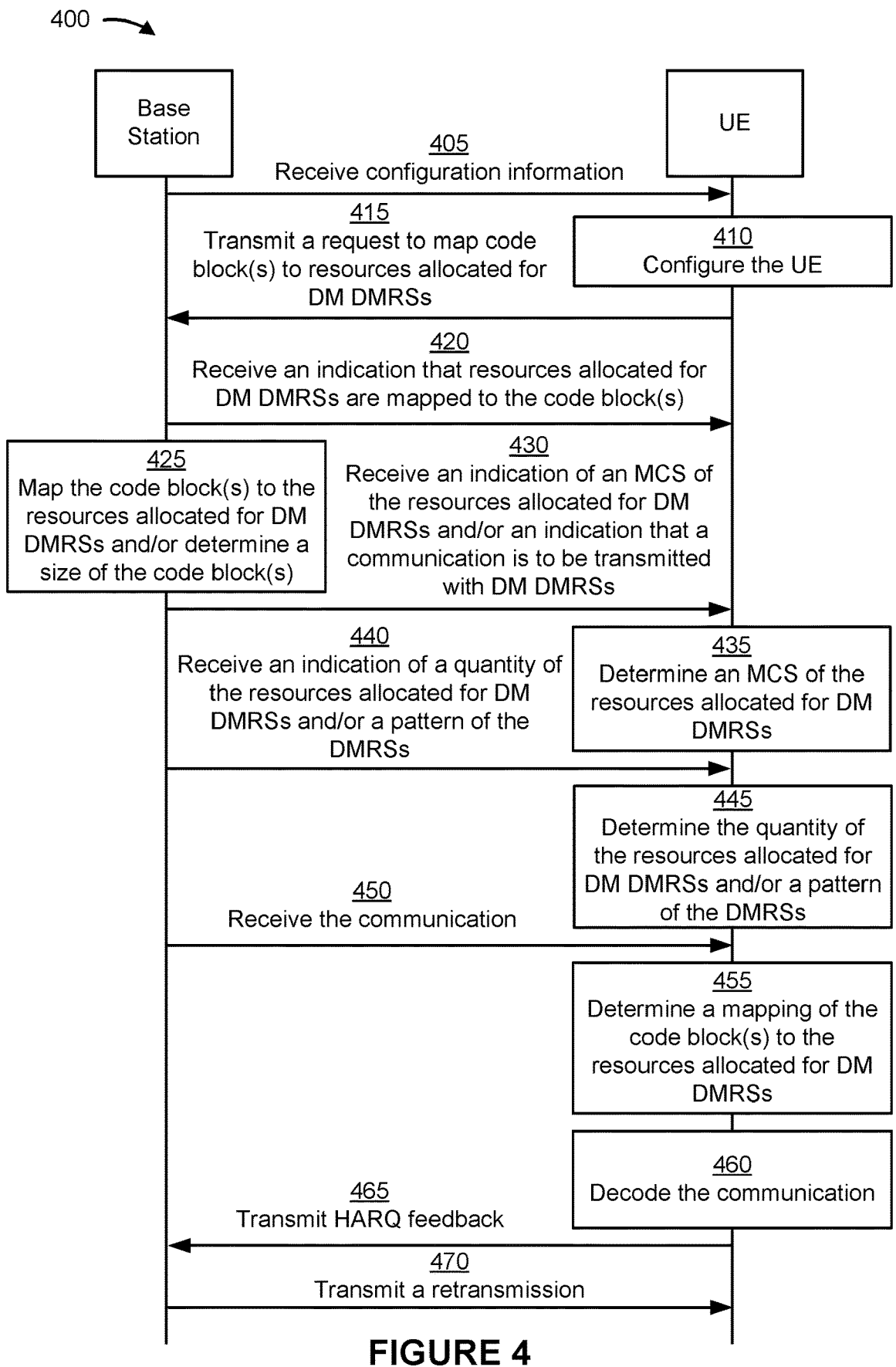
FIGS. 4 and 5 are diagrams illustrating examples associated with code block-based resource mapping for transmissions with data-modulated demodulation reference signals in accordance with the present disclosure.

FIG. 4 is a diagram illustrating an example 400 of code block-based resource mapping for transmissions with data-modulated DMRSs, in accordance with the present disclosure. As shown in FIG. 4, a UE (for example, UE 120) may communicate with a base station (for example, base station 110). The UE and the base station may be part of a wireless network (for example, wireless network 100). As shown in FIG. 4, the base station may transmit a communication having data-modulated DMRS to the UE.

In a first operation 405, the base station may transmit, and the UE may receive, configuration information. In some aspects, the UE may receive configuration information from another device (for example, from another base station, another UE, or the like). In some aspects, the UE may receive the configuration information via one or more of radio resource control (RRC) signaling, medium access control (MAC) signaling (for example, MAC control elements (MAC CEs)), or the like. In some aspects, the configuration information may include an indication of one or more configuration parameters (for example, already known to the UE) for selection by the UE, explicit configuration information for the UE to use to configure the UE, or the like.

In some aspects, the configuration information may indicate that the UE is to transmit a request to map one or more code blocks to resources allocated for data-modulated DMRSs (DM DMRSs). The configuration information may indicate that the UE is to receive an indication that resources allocated for DM DMRSs are mapped to the one or more code blocks. The configuration information may indicate that the UE is to receive an indication of an MCS of resources allocated for DM DMRSs or may indicate the MCS of resources allocated for DM DMRSs. In some aspects, the configuration information may indicate that the UE is to determine the MCS of the resources allocated for DM DMRS based at least in part on signaling from the base station or based at least in part on a communication protocol, among other examples. In some aspects, the configuration information may indicate that the UE is to receive an indication that a communication is to be transmitted (for example, by the base station) with DM DMRSs. The configuration information may indicate that the UE is to determine a mapping of the one or more code blocks to the resources allocated for DM DMRSs and to decode the communication.

In a second operation 410, the UE may configure itself for communicating with the base station. In some aspects, the UE may configure the UE based at least in part on the configuration information. In some aspects, the UE may be configured to perform one or more operations described herein.

In a third operation 415, the UE may transmit, and the base station may receive, a request to map one or more code blocks to resources allocated for DM DMRSs. For example, the UE may transmit the request based at least in part on a determination that the UE is likely to be configured to estimate the channel estimation with DM DMRSs or based at least in part on a determination that increased throughput is needed.

In a fourth operation 420, the UE may receive, and the base station may transmit, an indication that resources allocated for DM DMRSs are mapped to the one or more code blocks. In some aspects, the base station may transmit the indication based at least in part on, or independently from (for example, in absence of), the request to map the one or more code blocks to resources allocated for DM DMRSs.

In a fifth operation 425, the base station may map the one or more code blocks to the resources allocated for DM DMRSs or may determine a size of the one or more code blocks. For example, the base station may map the code block to resources of a physical shared channel (for example, PDSCH) that are allocated for DM DMRSs in which each of the resources carries both at least a portion of a DMRS sequence and data.

In some aspects, the one or more code blocks that are mapped to the resources allocated for DM DMRS may have a size that is different from a size of one or more code blocks that are mapped to resources, of the physical shared channel, that are allocated for only data. The size of the one or more code blocks may be based at least in part on a quantity of the resources that are allocated for the DM DMRSs or an MCS of the data-modulated DMRSs. In some aspects, the MCS may be based at least in part on feedback signaling associated with a communication previously transmitted by the base station that included DM DMRSs. For example, if the feedback indicated unsuccessful decoding of the communication previously transmitted, the MCS may be lower than an MCS of the communication previously transmitted.

In some aspects, the base station may map the one or more code blocks to a code block group that does not include any code blocks that are mapped to resources, of the physical shared channel, that are allocated for only data (for example, data and/or other signaling that does not include DMRS signals). For example, the base station may map all resources allocated for the DM DMRSs to code blocks of the code block group and may map all resources allocated for only data to additional code blocks of one or more additional code block groups.

In a sixth operation 430, the UE may receive, and the base station may transmit, an indication of an MCS of the resources allocated for DM DMRSs or an indication that a communication is to be transmitted with DM DMRSs. In some aspects, the base station may transmit the indication of the MCS in a same communication or in a different communication from the indication that the communication is to be transmitted with DM DMRSs. In some aspects, the base station may transmit the indication of the MCS or the indication that the communication is to be transmitted with DM DMRSs via downlink control information (DCI), RRC signaling, or one or more MAC CEs. For example, a DCI that schedules the communication may include the indication of the MCS or the indication that the communication is to be transmitted with DM DMRSs.

In some aspects, the indication of the MCS indicates a difference between the MCS of the resources allocated for the data-modulated DMRSs and an MCS of the resources allocated for only data of the communication. For example, the indication of the MCS of the resources allocated for DM DMRSs may include a delta value that indicates the MCS relative to an MCS of the resources allocated for only data of the communication.

In a seventh operation 435, the UE may determine the MCS of the resources allocated for DM DMRSs. For example, the UE may determine the MCS of the resources allocated for DM DMRSs based at least in part on signaling from the base station or based at least in part on a communication protocol. The MCS of the resources allocated for DM DMRSs may be lower than an MCS of data of the communication (for example, resources allocated for only data of the communication).

In some aspects, the UE may determine the MCS of the resources allocated for DM DMRS based at least in part on a configured MCS of data-modulated DMRSs (for example, as configured via a communication protocol or the configuration information, among other examples) or a configured difference of the MCS of data-modulated DMRSs and an MCS of data of the communication (for example, as configured via a communication protocol or the configuration information, among other examples), among other examples.

In an eighth operation 440, the UE my receive, and the base station may transmit, an indication of a quantity of the resources that are allocated for DM DMRSs or a pattern of the DMRSs. In some aspects, the base station may transmit the indication of the quantity of the resources allocated for DM DMRSs or a pattern of the DM DMRSs via configuration information, DCI, RRC signaling, or one or more MAC CEs, among other examples.

In a ninth operation 445, the UE may determine the quantity of the resources allocated for DM DMRSs or a pattern of the DM DMRSs. In some aspects, the UE may determine the quantity of the resources allocated for the DM DMRSs or the pattern of the DM DMRSs based at least in part on, or independently from (for example, in absence of), the indication, from the base station, of the quantity of the resources allocated for DM DMRSs or a pattern of the DM DMRSs.

In a tenth operation 450, the UE may receive, and the base station may transmit, the communication having the resources allocated for DM DMRSs mapped to the one or more code blocks. For example, the base station may transmit the communication, via the physical shared channel, that includes the one or more code blocks that are mapped to the resources that are allocated for the DM DMRSs.

In an eleventh operation 455, the UE may determine a mapping of the one or more code blocks to the resources allocated for DM DMRSs. In some aspects, the UE may determine a quantity of the resources allocated for DM DMRSs or a pattern of the DM DMRSs based at least in part on receiving configuration information, DCI, RRC signaling, or one or more MAC CEs, among other examples.

In a twelfth operation 460, the UE may decode the communication. In some aspects, decoding the communication may include performing a first stage channel estimation for the communication based at least in part on one or more DMRSs of the communication that are not data-modulated; performing channel decoding of the code block that is mapped to the resources, of the physical shared channel, that are allocated for the DM DMRSs; performing, based at least in part on successful channel decoding of the code block, second stage channel estimation for the physical shared channel based at least in part on a reconstruction of the resources, of the physical shared channel, that are allocated for the DM DMRSs; or decoding the communication based at least in part on the second stage channel estimation.

In some aspects, decoding the communication may include performing a first stage channel estimation for the communication based at least in part on one or more DMRSs of the communication that are not data-modulated; performing channel decoding of the code block that is mapped to the resources, of the physical shared channel, that are allocated for the data-modulated DMRSs; and decoding, based at least in part on unsuccessful channel decoding of the code block, a transmission based at least in part on the first stage channel estimation.

In a thirteenth operation 465, the UE may transmit, and the base station may receive, hybrid automatic repeat request (HARQ) feedback associated with the communication. In some aspects, the UE may transmit HARQ feedback that includes a negative acknowledgement (NACK) or an acknowledgment (ACK) for the code block group that includes only code blocks having resources allocated for DM DMRSs. The UE may also transmit HARQ feedback that includes a NACK or an ACK for code block groups that includes only code blocks having resources allocated for only data.

In a fourteenth operation 470, the UE may receive, and the base station may transmit, a retransmission of the communication. In some aspects, the base station may transmit a retransmission of the DM DMRSs in the retransmission of the communication based at least in part on receiving a NACK for the code block group that includes only code blocks having resources allocated for DM DMRSs. In some aspects, the base station may transmit the retransmission of the communication with DMRSs that are not data-modulated based at least in part on receiving an ACK for the code block group that includes only code blocks having resources allocated for DM DMRSs.

In some aspects, the base station may transmit a retransmission of the DM DMRSs in the retransmission of the communication based at least in part on receiving a NACK for at least one code block group that includes only code blocks having resources allocated for only data. In some aspects, the base station may transmit a retransmission of the DM DMRSs in the retransmission of the communication based at least in part on receiving a NACK for a quantity of code block groups that include only code blocks having resources allocated for only data, with the quantity satisfying a threshold. In some aspects, the base station may transmit a retransmission of the DM DMRSs in the retransmission of the communication based at least in part on receiving a NACK for all code block groups that include only code blocks having resources allocated for only data.

Figure 5:
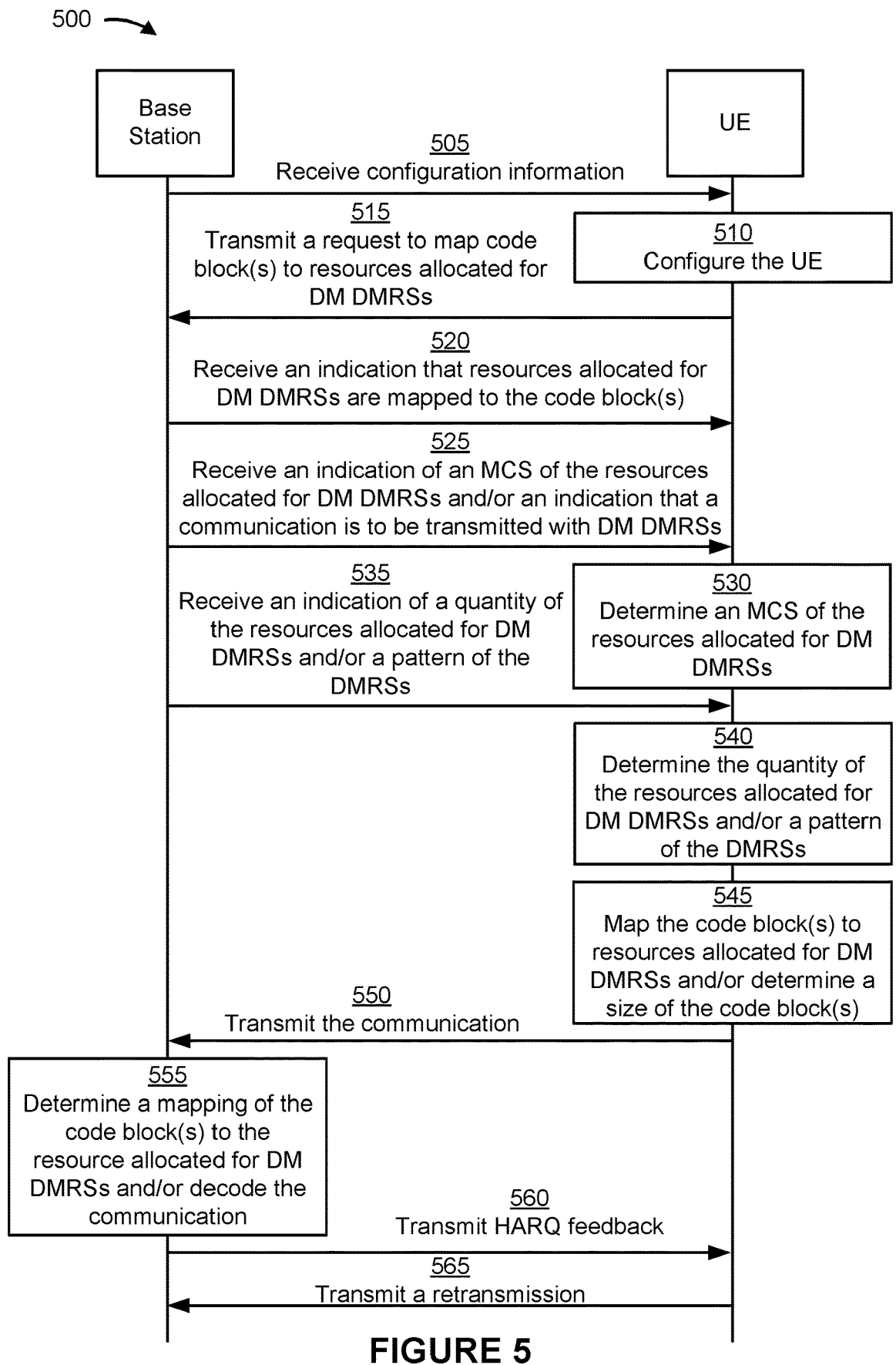

FIG. 5 is a diagram illustrating an example 500 of code block-based resource mapping for transmissions with data-modulated DMRSs, in accordance with the present disclosure. As shown in FIG. 5, a UE (for example, UE 120) may communicate with a base station (for example, base station 110). The UE and the base station may be part of a wireless network (for example, wireless network 100). As shown in FIG. 5, the UE may transmit a communication having data-modulated DMRS to the base station.

In a first operation 505, the base station may transmit, and the UE may receive, configuration information. In some aspects, the UE may receive configuration information from another device (for example, from another base station, another UE, or the like). In some aspects, the UE may receive the configuration information via one or more of RRC signaling, MAC signaling (for example, MAC CEs), or the like. In some aspects, the configuration information may include an indication of one or more configuration parameters (for example, already known to the UE) for selection by the UE, explicit configuration information for the UE to use to configure the UE, or the like.

In some aspects, the configuration information may indicate that the UE is to transmit a request to map one or more code blocks to resources allocated for DM DMRSs. The configuration information may indicate that the UE is to receive an indication that resources allocated for DM DMRSs are mapped to the one or more code blocks. The configuration information may indicate that the UE is to receive an indication of an MCS of resources allocated for DM DMRSs or may indicate the MCS of resources allocated for DM DMRSs. In some aspects, the configuration information may indicate that the UE is to determine the MCS of the resources allocated for DM DMRS based at least in part on signaling from the base station or based at least in part on a communication protocol, among other examples. In some aspects, the configuration information may indicate that the UE is to receive an indication that a communication is to be transmitted (for example, by the UE) with DM DMRSs. The configuration information may indicate that the UE is to map the one or more code blocks to the resources allocated for DM DMRSs or to determine the a size of the one or more code blocks.

In a second operation 510, the UE may configure itself for communicating with the base station. In some aspects, the UE may configure the UE based at least in part on the configuration information. In some aspects, the UE may be configured to perform one or more operations described herein.

In a third operation 515, the UE may transmit, and the base station may receive, a request to map one or more code blocks to resources allocated for DM DMRSs. For example, the UE may transmit the request based at least in part on a determination that the base station is likely to be configured to estimate the channel estimation with DM DMRSs or based at least in part on a determination that increased throughput is needed.

In a fourth operation 520, the UE may receive, and the base station may transmit, an indication that resources allocated for DM DMRSs are mapped to the one or more code blocks. In some aspects, the base station may transmit the indication based at least in part on, or independently from (for example, in absence of), the request to map the one or more code blocks to resources allocated for DM DMRSs.

In a fifth operation 525, the UE may receive, and the base station may transmit, an indication of an MCS of the resources allocated for DM DMRSs or an indication that a communication is to be transmitted with DM DMRSs. In some aspects, the base station may transmit the indication of the MCS in a same communication or in a different communication from the indication that the communication is to be transmitted with DM DMRSs. In some aspects, the base station may transmit the indication of the MCS or the indication that the communication is to be transmitted with DM DMRSs via DCI, RRC signaling, or one or more MAC CEs. For example, a DCI that schedules the communication may include the indication of the MCS or the indication that the communication is to be transmitted with DM DMRSs.

In some aspects, the indication of the MCS indicates a difference between the MCS of the resources allocated for the data-modulated DMRSs and an MCS of the resources allocated for only data of the communication. For example, the indication of the MCS of the resources allocated for DM DMRSs may include a delta value that indicates the MCS relative to an MCS of the resources allocated for only data of the communication.

In a sixth operation 530, the UE may determine the MCS of the resources allocated for DM DMRSs. For example, the UE may determine the MCS of the resources allocated for DM DMRSs based at least in part on signaling from the base station or based at least in part on a communication protocol. The MCS of the resources allocated for DM DMRSs may be lower than an MCS of data of the communication (for example, resources allocated for only data of the communication).

In some aspects, the UE may determine the MCS of the resources allocated for DM DMRS based at least in part on a configured MCS of data-modulated DMRSs (for example, as configured via a communication protocol or the configuration information, among other examples) or a configured difference of the MCS of data-modulated DMRSs and an MCS of data of the communication (for example, as configured via a communication protocol or the configuration information, among other examples), among other examples.

In a seventh operation 535, the UE my receive, and the base station may transmit, an indication of a quantity of the resources that are allocated for DM DMRSs or a pattern of the DMRSs. In some aspects, the base station may transmit the indication of the quantity of the resources allocated for DM DMRSs or a pattern of the DM DMRSs via configuration information, DCI, RRC signaling, or one or more MAC CEs, among other examples.

In an eighth operation 540, the UE may determine the quantity of the resources allocated for DM DMRSs or a pattern of the DM DMRSs. In some aspects, the UE may determine the quantity of the resources allocated for the DM DMRSs or the pattern of the DM DMRSs based at least in part on, or independently from (for example, in absence of), the indication, from the base station, of the quantity of the resources allocated for DM DMRSs or a pattern of the DM DMRSs.

In a ninth operation 545, the UE may map the one or more code blocks to the resources allocated for DM DMRSs or may determine a size of the one or more code blocks. For example, the UE may map the code block to resources of a physical shared channel (for example, PUSCH) that are allocated for DM DMRSs in which each of the resources carries both at least a portion of a DMRS sequence and data.

In some aspects, the one or more code blocks that are mapped to the resources allocated for DM DMRS may have a size that is different from a size of one or more code blocks that are mapped to resources, of the physical shared channel, that are allocated for only data. The size of the one or more code blocks may be based at least in part on a quantity of the resources that are allocated for the DM DMRSs or an MCS of the data-modulated DMRSs. In some aspects, the MCS may be based at least in part on feedback signaling associated with a communication previously transmitted by the UE that included DM DMRSs. For example, if the feedback indicated unsuccessful decoding of the communication previously transmitted, the MCS may be lower than an MCS of the communication previously transmitted.

In some aspects, the UE may map the one or more code blocks to a code block group that does not include any code blocks that are mapped to resources, of the physical shared channel, that are allocated for only data. For example, the UE may map all resources allocated for the DM DMRSs to code blocks of the code block group and may map all resources allocated for only data to additional code blocks of one or more additional code block groups.

In a tenth operation 550, the UE may transmit, and the base station may receive, the communication having the resources allocated for DM DMRSs mapped to the one or more code blocks. For example, the UE may transmit the communication, via the physical shared channel, that includes the one or more code blocks that are mapped to the resources that are allocated for the DM DMRSs.

In an eleventh operation 555, the base station may determine a mapping of the one or more code blocks to the resources allocated for DM DMRSs or may decode the communication. In some aspects, the base station may determine a quantity of the resources allocated for DM DMRSs or a pattern of the DM DMRSs based at least in part on configuration information, DCI, RRC signaling, or one or more MAC CEs, among other examples that the base station transmitted to the UE.

In some aspects, decoding the communication may include performing a first stage channel estimation for the communication based at least in part on one or more DMRSs of the communication that are not data-modulated; performing channel decoding of the code block that is mapped to the resources, of the physical shared channel, that are allocated for the DM DMRSs; performing, based at least in part on successful channel decoding of the code block, second stage channel estimation for the physical shared channel based at least in part on a reconstruction of the resources, of the physical shared channel, that are allocated for the DM DMRSs; or decoding the communication based at least in part on the second stage channel estimation.

In some aspects, decoding the communication may include performing a first stage channel estimation for the communication based at least in part on one or more DMRSs of the communication that are not data-modulated; performing channel decoding of the code block that is mapped to the resources, of the physical shared channel, that are allocated for the data-modulated DMRSs; and decoding, based at least in part on unsuccessful channel decoding of the code block, a transmission based at least in part on the first stage channel estimation.

In a twelfth operation 560, the base station may transmit, and the UE may receive, HARQ feedback associated with the communication. In some aspects, the base station may transmit HARQ feedback that includes a NACK or an ACK for the code block group that includes only code blocks having resources allocated for DM DMRSs. The base station may also transmit HARQ feedback that includes a NACK or an ACK for code block groups that includes only code blocks having resources allocated for only data.

In a thirteenth operation 565, the UE may transmit, and the base station may receive, a retransmission of the communication. In some aspects, the UE may transmit a retransmission of the DM DMRSs in the retransmission of the communication based at least in part on receiving a NACK for the code block group that includes only code blocks having resources allocated for DM DMRSs. In some aspects, the UE may transmit the retransmission of the communication with DMRSs that are not data-modulated based at least in part on receiving an ACK for the code block group that includes only code blocks having resources allocated for DM DMRSs.

In some aspects, the UE may transmit a retransmission of the DM DMRSs in the retransmission of the communication based at least in part on receiving a NACK for at least one code block group that includes only code blocks having resources allocated for only data. In some aspects, the UE may transmit a retransmission of the DM DMRSs in the retransmission of the communication based at least in part on receiving a NACK for a quantity of code block groups that include only code blocks having resources allocated for only data, with the quantity satisfying a threshold. In some aspects, the UE may transmit a retransmission of the DM DMRSs in the retransmission of the communication based at least in part on receiving a NACK for all code block groups that include only code blocks having resources allocated for only data.

Figure 6:
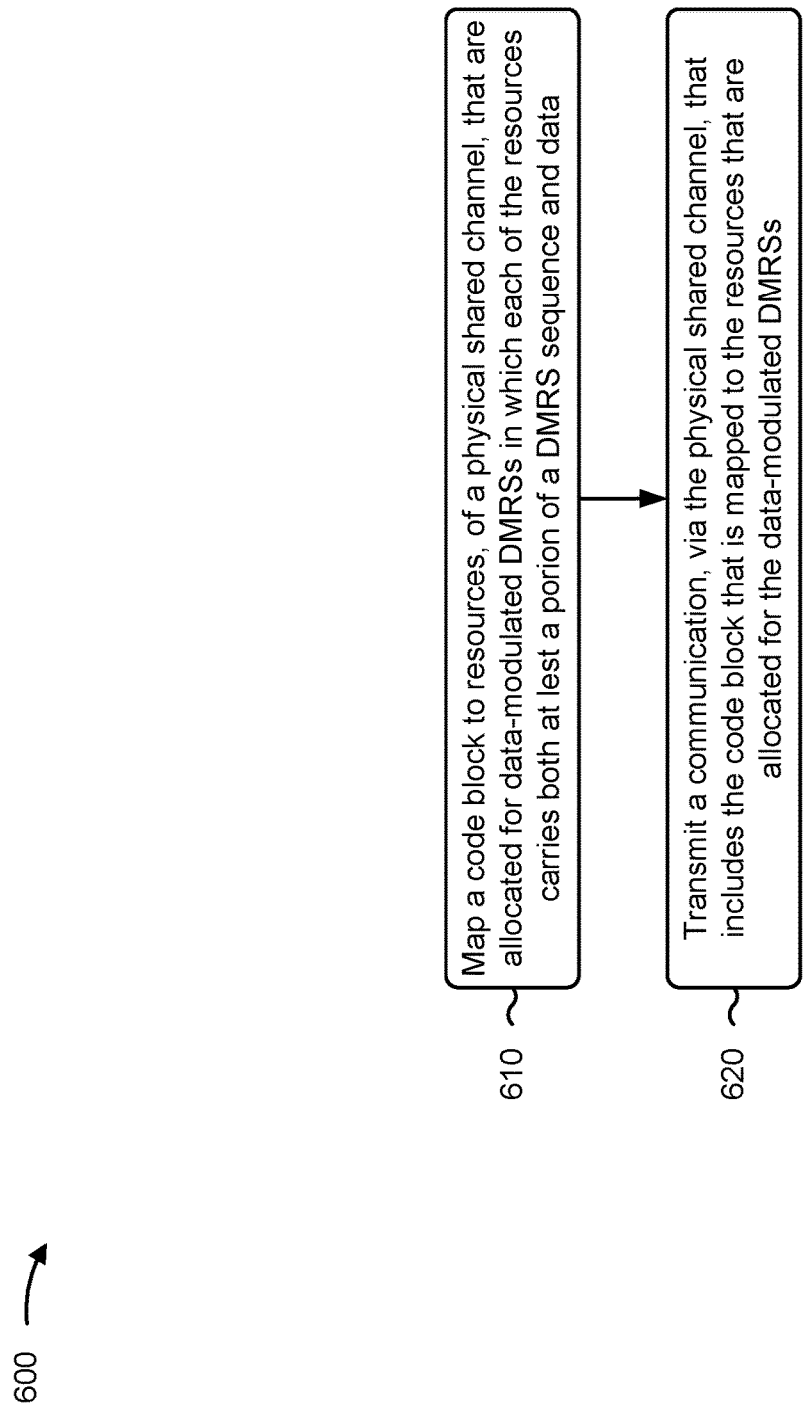
FIG. 6 is a flowchart illustrating an example process performed, for example, by a UE in accordance with the present disclosure.

FIG. 6 is a flowchart illustrating an example process 600 performed, for example, by a wireless communication device (for example, a transmitter device) in accordance with the present disclosure. Example process 600 is an example where the wireless communication device (for example, base station 110 or UE 120) performs operations associated with code block-based resource mapping for transmissions with DM DMRSs.

As shown in FIG. 6, in some aspects, process 600 may include mapping a code block to resources, of a physical shared channel, that are allocated for data-modulated DMRSs in which each of the resources carries both at least a portion of a DMRS sequence and data (block 610). For example, the wireless communication device (such as by using communication manager 140 or 150 or mapping component 810, depicted in FIG. 8) may map a code block to resources, of a physical shared channel, that are allocated for data-modulated DMRSs in which each of the resources carries both at least a portion of a DMRS sequence and data, as described above.

As further shown in FIG. 6, in some aspects, process 600 may include transmitting a communication, via the physical shared channel, that includes the code block that is mapped to the resources that are allocated for the data-modulated DMRSs (block 620). For example, the wireless communication device (such as by using communication manager 140 or 150 or transmission component 804, depicted in FIG. 8) may transmit a communication, via the physical shared channel, that includes the code block that is mapped to the resources that are allocated for the data-modulated DMRSs, as described above.

Process 600 may include additional aspects, such as any single aspect or any combination of aspects described below or in connection with one or more other processes described elsewhere herein.

In a first additional aspect, process 600 includes one or more of receiving a request to map the code block to the resources that are allocated for the data-modulated DMRSs, or transmitting an indication that the resources that are allocated for the data-modulated DMRSs are mapped to the code block.

In a second additional aspect, alone or in combination with the first aspect, the code block has a size that is different from a size of one or more code blocks that are mapped to resources, of the physical shared channel, that are allocated for only data, and wherein the size of the code block is based at least in part on one or more of a quantity of the resources that are allocated for the data-modulated DMRSs, or an MCS of the data-modulated DMRSs.

In a third additional aspect, alone or in combination with one or more of the first and second aspects, process 600 includes transmitting an indication of an MCS of the resources allocated for the data-modulated DMRS, or receiving an indication of the MCS of the resources allocated for data-modulated DMRSs In a fourth additional aspect, alone or in combination with one or more of the first through third aspects, transmitting the indication of the MCS comprises transmitting the indication of the MCS with an indication that the communication is to be transmitted with data-modulated DMRSs, or wherein receiving the indication of the MCS comprises receiving the indication of the MCS with an indication that the communication is to be transmitted with data-modulated DMRSs.

In a fifth additional aspect, alone or in combination with one or more of the first through fourth aspects, the indication of the MCS is based at least in part on feedback signaling associated with a communication previously transmitted by the wireless device that includes data-modulated DMRSs.

In a sixth additional aspect, alone or in combination with one or more of the first through fifth aspects, receiving the indication of the MCS comprises receiving the indication of the MCS via DCI, RRC signaling, or one or more MAC CEs.

In a seventh additional aspect, alone or in combination with one or more of the first through sixth aspects, the indication of the MCS indicates a difference between the MCS of the resources allocated for data-modulated DMRSs and an MCS of the resources allocated for only data of the communication.

In an eighth additional aspect, alone or in combination with one or more of the first through seventh aspects, process 600 includes determining an MCS of the resources allocated for data-modulated DMRSs based at least in part on one or more of a configured MCS of data-modulated DMRSs, or a configured difference of the MCS of data-modulated DMRSs and an MCS of data of the communication.

In a ninth additional aspect, alone or in combination with one or more of the first through eighth aspects, an MCS of data-modulated DMRSs is lower than an MCS of data of the communication.

In a tenth additional aspect, alone or in combination with one or more of the first through ninth aspects, process 600 includes mapping an additional code block to additional resources, of the physical shared channel, that are allocated for data-modulated DMRSs.

In an eleventh additional aspect, alone or in combination with one or more of the first through tenth aspects, process 600 includes one or more of determining one or more of a quantity of the resources or a pattern of the data-modulated DMRSs based at least in part on receiving one or more of configuration information, DCI, RRC signaling, or one or more MAC CEs, or indicating one or more of the quantity of the resources or the pattern of the data-modulated DMRSs via one or more of configuration information, DCI, RRC signaling, or one or more MAC CEs.

In a twelfth additional aspect, alone or in combination with one or more of the first through eleventh aspects, process 600 includes mapping the code block to a code block group that does not include any code blocks that are mapped to resources, of the physical shared channel, that are allocated for only data.

In a thirteenth additional aspect, alone or in combination with one or more of the first through twelfth aspects, process 600 includes receiving HARQ feedback for the code block group, and transmitting, based at least in part on receiving NACK feedback for the code block group, a retransmission of the data-modulated DMRSs in a subsequent retransmission of the communication, or transmitting, based at least in part on receiving ACK feedback for the code block group, a subsequent retransmission of the communication with DMRSs that are not data-modulated.

In a fourteenth additional aspect, alone or in combination with one or more of the first through thirteenth aspects, process 600 includes transmitting a retransmission of the data-modulated DMRSs in a subsequent retransmission of the communication based at least in part on receiving NACK feedback for at least one code block group that is mapped to resources, of the physical shared channel, that are allocated for only data, receiving NACK feedback for a quantity of code block groups that are mapped to resources, of the physical shared channel, that are allocated for only data, the quantity satisfying a threshold, or receiving NACK feedback for all code block groups that are mapped to resources, of the physical shared channel, that are allocated for only data.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
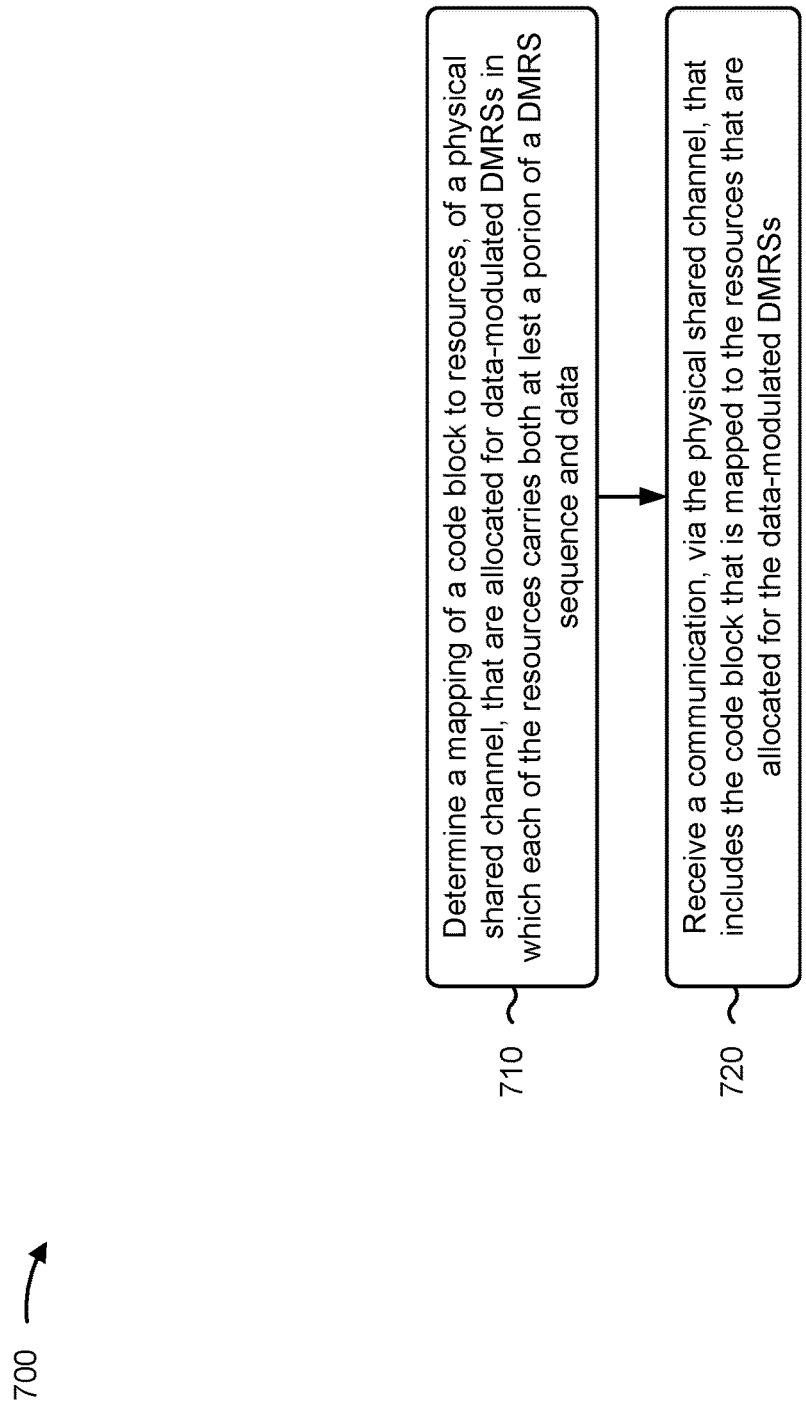
FIG. 7 is a flowchart illustrating an example process performed, for example, by a receiver device in accordance with the present disclosure.

FIG. 7 is a flowchart illustrating an example process 700 performed, for example, by a wireless communication device (a receiver device) in accordance with the present disclosure. Example process 700 is an example where the wireless communication device (for example, base station 110 or UE 120) performs operations associated with code block-based resource mapping for transmissions with DM DMRSs.

As shown in FIG. 7, in some aspects, process 700 may include determining a mapping of a code block to resources, of a physical shared channel, that are allocated for data-modulated DMRSs in which each of the resources carries both at least a portion of a DMRS sequence and data (block 710). For example, the wireless communication device (such as by using communication manager 140 or 150 or determination component 908, depicted in FIG. 9) may determine a mapping of a code block to resources, of a physical shared channel, that are allocated for data-modulated DMRSs in which each of the resources carries both at least a portion of a DMRS sequence and data, as described above.

As further shown in FIG. 7, in some aspects, process 700 may include receiving a communication, via the physical shared channel, that includes the code block that is mapped to the resources that are allocated for the data-modulated DMRSs (block 720). For example, the wireless communication device (such as by using communication manager 140 or 150 or reception component 902, depicted in FIG. 9) may receive a communication, via the physical shared channel, that includes the code block that is mapped to the resources that are allocated for the data-modulated DMRSs, as described above.

Process 700 may include additional aspects, such as any single aspect or any combination of aspects described below or in connection with one or more other processes described elsewhere herein.

In a first additional aspect, process 700 includes performing a first stage channel estimation for the communication based at least in part on one or more DMRSs of the communication that are not data-modulated, performing channel decoding of the code block that is mapped to the resources, of the physical shared channel, that are allocated for the data-modulated DMRSs, performing, based at least in part on successful channel decoding of the code block, second stage channel estimation for the physical shared channel based at least in part on a reconstruction of the resources, of the physical shared channel, that are allocated for the data-modulated DMRSs, and decoding the communication based at least in part on the second stage channel estimation.

In a second additional aspect, alone or in combination with the first aspect, process 700 includes performing a first stage channel estimation for the communication based at least in part on one or more DMRSs of the communication that are not data-modulated, performing channel decoding of the code block that is mapped to the resources, of the physical shared channel, that are allocated for the data-modulated DMRSs, and decoding, based at least in part on unsuccessful channel decoding of the code block, a transmission based at least in part on the first stage channel estimation.

In a third additional aspect, alone or in combination with one or more of the first and second aspects, process 700 includes one or more of transmitting a request to map the code block to the resources that are allocated for the data-modulated DMRSs, or receiving an indication that the resources that are allocated for the data-modulated DMRSs are mapped to the code block.

In a fourth additional aspect, alone or in combination with one or more of the first through third aspects, the code block has a size that is different from a size of one or more code blocks that are mapped to resources, of the physical shared channel, that are allocated for only data, and wherein the size of the code block is based at least in part on one or more of a quantity of the resources that are allocated for the data-modulated DMRSs, or an MCS of the data-modulated DMRSs.

In a fifth additional aspect, alone or in combination with one or more of the first through fourth aspects, process 700 includes transmitting an indication of an MCS of the resources allocated for data-modulated DMRS, or receiving an indication of the MCS of the resources allocated for data-modulated DMRSs.

In a sixth additional aspect, alone or in combination with one or more of the first through fifth aspects, transmitting the indication of the MCS comprises transmitting the indication of the MCS with an indication that the communication is to be transmitted with data-modulated DMRSs, or wherein receiving the indication of the MCS comprises receiving the indication of the MCS with an indication that the communication is to be transmitted with data-modulated DMRSs.

In a seventh additional aspect, alone or in combination with one or more of the first through sixth aspects, the indication of the MCS is based at least in part on feedback signaling associated with a communication previously transmitted by the wireless device that includes data-modulated DMRSs.

In an eighth additional aspect, alone or in combination with one or more of the first through seventh aspects, transmitting the indication of the MCS comprises transmitting the indication of the MCS via DCI, RRC signaling, or one or more MAC CEs.

In a ninth additional aspect, alone or in combination with one or more of the first through eighth aspects, the indication of the MCS indicates a difference between the MCS of the resources allocated for the data-modulated DMRSs and an MCS of the resources allocated for only data of the communication.

In a tenth additional aspect, alone or in combination with one or more of the first through ninth aspects, process 700 includes determining an MCS of the resources allocated for the data-modulated DMRSs based at least in part on one or more of a configured MCS of the data-modulated DMRSs, or a configured difference of the MCS of the data-modulated DMRSs and an MCS of data of the communication.

In an eleventh additional aspect, alone or in combination with one or more of the first through tenth aspects, an MCS of the data-modulated DMRSs is lower than an MCS of data of the communication.

In a twelfth additional aspect, alone or in combination with one or more of the first through eleventh aspects, process 700 includes determining a mapping of an additional code block to additional resources, of the physical shared channel, that are allocated for the data-modulated DMRSs.

In a thirteenth additional aspect, alone or in combination with one or more of the first through twelfth aspects, process 700 includes one or more of determining one or more of a quantity of the resources or a pattern of the data-modulated DMRSs based at least in part on receiving one or more of configuration information, DCI, RRC signaling, or one or more MAC CEs, or indicating one or more of the quantity of the resources or the pattern of the data-modulated DMRSs via one or more of configuration information, DCI, RRC signaling, or one or more MAC CEs.

In a fourteenth additional aspect, alone or in combination with one or more of the first through thirteenth aspects, process 700 includes mapping the code block to a code block group that does not include any code blocks that are mapped to resources, of the physical shared channel, that are allocated for only data.

In a fifteenth additional aspect, alone or in combination with one or more of the first through fourteenth aspects, process 700 includes transmitting HARQ feedback for the code block group, and receiving, based at least in part on transmitting NACK feedback for the code block group, a retransmission of the data-modulated DMRSs in a subsequent retransmission of the communication, or receiving, based at least in part on transmitting ACK feedback for the code block group, a subsequent retransmission of the communication with DMRSs that are not data-modulated.

In a sixteenth additional aspect, alone or in combination with one or more of the first through fifteenth aspects, process 700 includes receiving a retransmission of the data-modulated DMRSs in a subsequent retransmission of the communication based at least in part on transmitting NACK feedback for at least one code block group that is mapped to resources, of the physical shared channel, that are allocated for only data, transmitting NACK feedback for a quantity of code block groups that are mapped to resources, of the physical shared channel, that are allocated for only data, the quantity satisfying a threshold, or transmitting NACK feedback for all code block groups that are mapped to resources, of the physical shared channel, that are allocated for only data.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
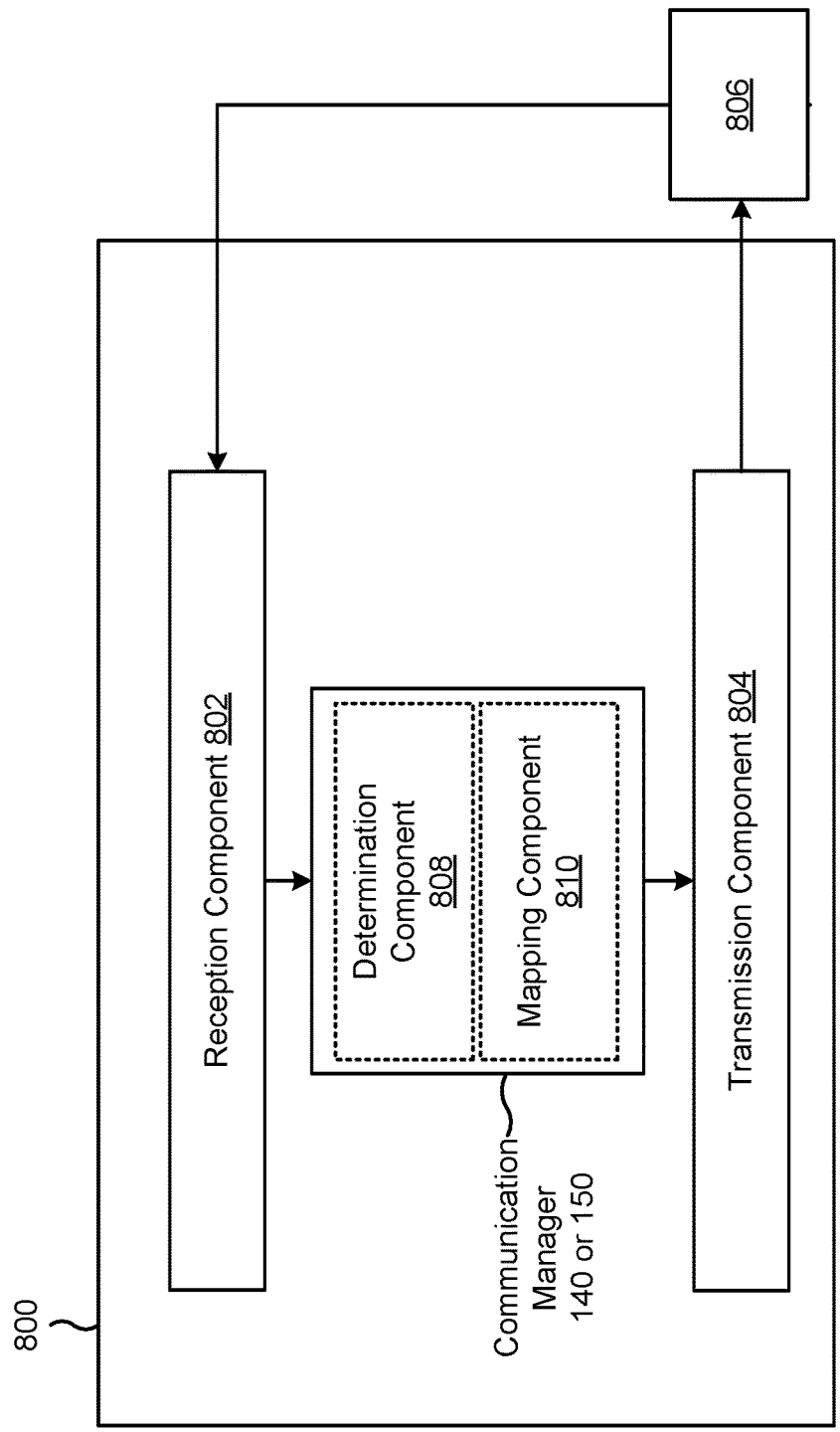
FIGS. 8 and 9 are block diagrams of example apparatuses for wireless communication in accordance with the present disclosure.

FIG. 8 is a block diagram of an example apparatus 800 for wireless communication in accordance with the present disclosure. The apparatus 800 (for example, a transmitter device) may be a wireless communication device, or a wireless communication device may include the apparatus 800. In some aspects, the apparatus 800 includes a reception component 802, a transmission component 804, and a communication manager 140 or 150, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 4 or 5. Additionally or alternatively, the apparatus 800 may be configured to perform one or more processes described herein, such as process 600 of FIG. 6 In some aspects, the apparatus 800 may include one or more components of the wireless communication device described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140 or 150. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, the communication manager 140 or 150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The communication manager 140 or 150 may map a code block to resources, of a physical shared channel, that are allocated for data-modulated DMRSs in which each of the resources carries both at least a portion of a DMRS sequence and data. The communication manager 140 or 150 may transmit or may cause the transmission component 804 to transmit a communication, via the physical shared channel, that includes the code block that is mapped to the resources that are allocated for the data-modulated DMRSs. In some aspects, the communication manager 140 or 150 may perform one or more operations described elsewhere herein as being performed by one or more components of the communication manager 140 or 150.

The communication manager 140 or 150 may include a controller/processor, a memory, a scheduler, a communication unit, or a combination thereof, of the wireless communication device described above in connection with FIG. 2. In some aspects, the communication manager 140 or 150 includes a set of components, such as a determination component 808, a mapping component 810, or a combination thereof. Alternatively, the set of components may be separate and distinct from the communication manager 140 or 150. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The mapping component 810 may map a code block to resources, of a physical shared channel, that are allocated for data-modulated DMRSs in which each of the resources carries both at least a portion of a DMRS sequence and data. The transmission component 804 may transmit a communication, via the physical shared channel, that includes the code block that is mapped to the resources that are allocated for the data-modulated DMRSs.

The transmission component 804 may transmit an indication of an MCS of the resources allocated for data-modulated DMRS.

The reception component 802 may receive an indication of the MCS of the resources allocated for data-modulated DMRSs.

The determination component 808 may determine an MCS of the resources allocated for data-modulated DMRSs based at least in part on one or more of a configured MCS of data-modulated DMRSs; or a configured difference of the MCS of data-modulated DMRSs and an MCS of data of the communication.

The mapping component 810 may map an additional code block to additional resources, of the physical shared channel, that are allocated for data-modulated DMRSs.

The mapping component 810 may map the code block to a code block group that does not include any code blocks that are mapped to resources, of the physical shared channel, that are allocated for only data.

The reception component 802 may receive HARQ feedback for the code block group.

The transmission component 804 may transmit, based at least in part on receiving NACK feedback for the code block group, a retransmission of the data-modulated DMRSs in a subsequent retransmission of the communication transmitting, based at least in part on receiving ACK feedback for the code block group, a subsequent retransmission of the communication with DMRSs that are not data-modulated.

The transmission component 804 may transmit a retransmission of the data-modulated DMRSs in a subsequent retransmission of the communication based at least in part on receiving NACK feedback for at least one code block group that is mapped to resources, of the physical shared channel, that are allocated for only data, receiving NACK feedback for a quantity of code block groups that are mapped to resources, of the physical shared channel, that are allocated for only data, the quantity satisfying a threshold, or receiving NACK feedback for all code block groups that are mapped to resources, of the physical shared channel, that are allocated for only data.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
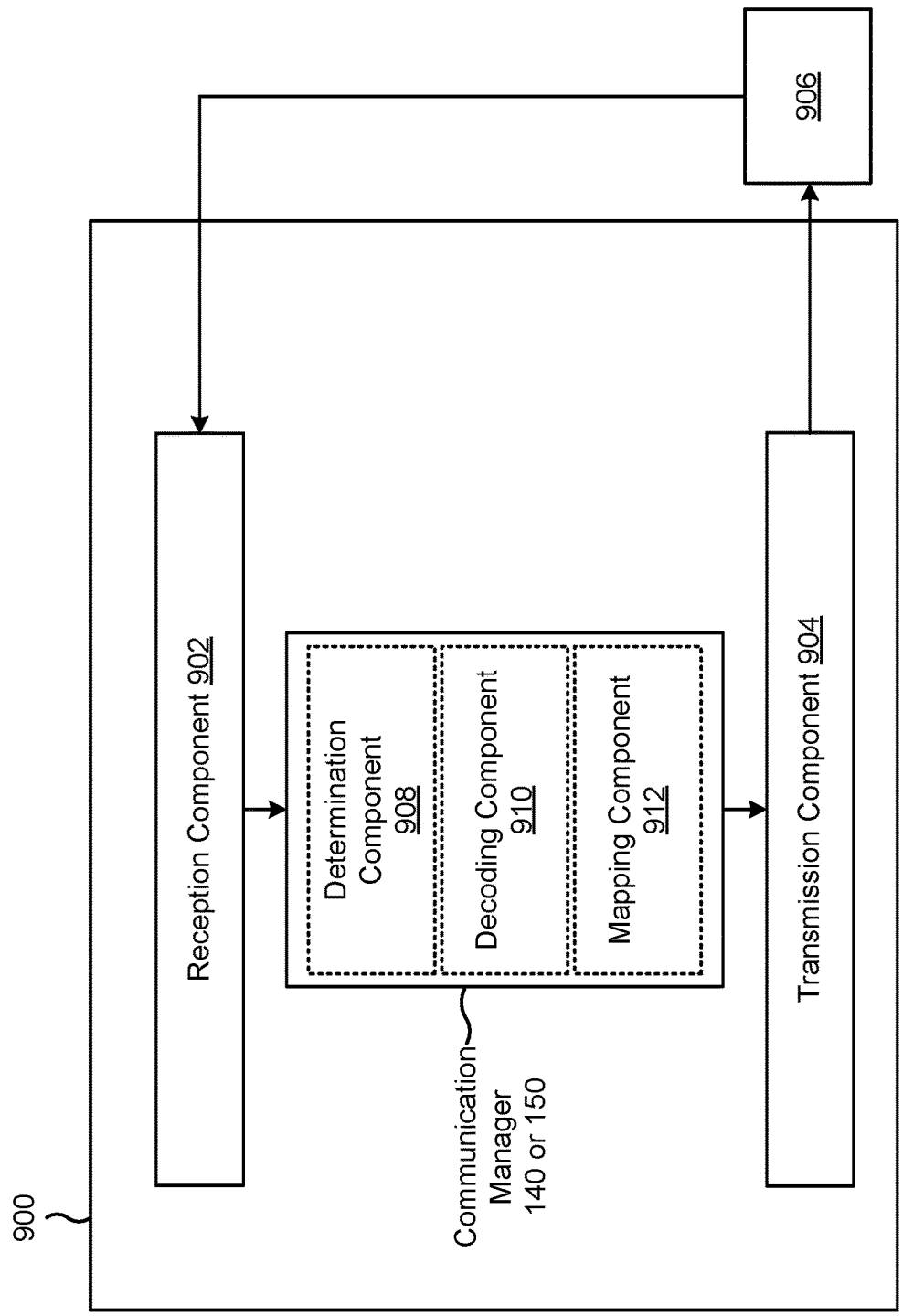

FIG. 9 is a block diagram of an example apparatus 900 for wireless communication in accordance with the present disclosure. The apparatus 900 may be a wireless communication device, or a wireless communication device may include the apparatus 900. In some aspects, the apparatus 900 includes a reception component 902, a transmission component 904, and a communication manager 140 or 150, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4 and 5. Additionally or alternatively, the apparatus 900 may be configured to perform one or more processes described herein, such as process 700 of FIG. 7. In some aspects, the apparatus 900 may include one or more components of the wireless communication device described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140 or 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 904 may transmit communications, such as reference signals, control information, data communications, or a combination thereof, to the apparatus 906. In some aspects, the communication manager 140 or 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device described above in connection with FIG. 2. In some aspects, the transmission component 904 may be co-located with the reception component 902 in a transceiver.

The communication manager 140 or 150 may determine a mapping of a code block to resources, of a physical shared channel, that are allocated for data-modulated DMRSs in which each of the resources carries both at least a portion of a DMRS sequence and data. The communication manager 140 or 150 may receive or may cause the reception component 902 to receive a communication, via the physical shared channel, that includes the code block that is mapped to the resources that are allocated for the data-modulated DMRSs. In some aspects, the communication manager 140 or 150 may perform one or more operations described elsewhere herein as being performed by one or more components of the communication manager 140 or 150.

The communication manager 140 or 150 may include a controller/processor, a memory, a scheduler, a communication unit, or a combination thereof, of the wireless communication device described above in connection with FIG. 2. In some aspects, the communication manager 140 or 150 includes a set of components, such as a determination component 908, a decoding component 910, a mapping component 912, or a combination thereof. Alternatively, the set of components may be separate and distinct from the communication manager 140 or 150. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 908 may determine a mapping of a code block to resources, of a physical shared channel, that are allocated for data-modulated DMRSs in which each of the resources carries both at least a portion of a DMRS sequence and data. The reception component 902 may receive a communication, via the physical shared channel, that includes the code block that is mapped to the resources that are allocated for the data-modulated DMRSs.

The decoding component 910 may perform a first stage channel estimation for the communication based at least in part on one or more DMRSs of the communication that are not data-modulated.

The decoding component 910 may perform channel decoding of the code block that is mapped to the resources, of the physical shared channel, that are allocated for the data-modulated DMRSs.

The decoding component 910 may perform, based at least in part on successful channel decoding of the code block, second stage channel estimation for the physical shared channel based at least in part on a reconstruction of the resources, of the physical shared channel, that are allocated for the data-modulated DMRSs.

The decoding component 910 may decode the communication based at least in part on the second stage channel estimation.

The decoding component 910 may perform a first stage channel estimation for the communication based at least in part on one or more DMRSs of the communication that are not data-modulated.

The decoding component 910 may perform channel decoding of the code block that is mapped to the resources, of the physical shared channel, that are allocated for the data-modulated DMRSs.

The decoding component 910 may decode, based at least in part on unsuccessful channel decoding of the code block, a transmission based at least in part on the first stage channel estimation.

The transmission component 904 may transmit an indication of an MCS of the resources allocated for data-modulated DMRS.

The reception component 902 may receive an indication of the MCS of the resources allocated for data-modulated DMRSs.

The determination component 908 may determine an MCS of the resources allocated for the data-modulated DMRSs based at least in part on one or more of a configured MCS of the data-modulated DMRSs, or a configured difference of the MCS of the data-modulated DMRSs and an MCS of data of the communication.

The determination component 908 may determine a mapping of an additional code block to additional resources, of the physical shared channel, that are allocated for the data-modulated DMRSs.

The mapping component 912 may map the code block to a code block group that does not include any code blocks that are mapped to resources, of the physical shared channel, that are allocated for only data.

The transmission component 904 may transmit HARQ feedback for the code block group.

The reception component 902 may receive, based at least in part on transmitting NACK feedback for the code block group, a retransmission of the data-modulated DMRSs in a subsequent retransmission of the communication receiving, based at least in part on transmitting ACK feedback for the code block group, a subsequent retransmission of the communication with DMRSs that are not data-modulated.

The reception component 902 may receive a retransmission of the data-modulated DMRSs in a subsequent retransmission of the communication based at least in part on transmitting NACK feedback for at least one code block group that is mapped to resources, of the physical shared channel, that are allocated for only data, transmitting NACK feedback for a quantity of code block groups that are mapped to resources, of the physical shared channel, that are allocated for only data, the quantity satisfying a threshold, or transmitting NACK feedback for all code block groups that are mapped to resources, of the physical shared channel, that are allocated for only data.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless communication device, comprising: mapping a code block to resources, of a physical shared channel, that are allocated for data-modulated demodulation reference signals (DMRSs) in which each of the resources carries both at least a portion of a DMRS sequence and data; and transmitting a communication, via the physical shared channel, that includes the code block that is mapped to the resources that are allocated for the data-modulated DMRSs.

Aspect 2: The method of Aspect 1, further comprising: receiving a request to map the code block to the resources that are allocated for the data-modulated DMRSs; or transmitting an indication that the resources that are allocated for the data-modulated DMRSs are mapped to the code block.

Aspect 3: The method of any of Aspects 1-2, wherein the code block has a size that is different from a size of one or more code blocks that are mapped to resources, of the physical shared channel, that are allocated for only data, and wherein the size of the code block is based at least in part on one or more of: a quantity of the resources that are allocated for the data-modulated DMRSs, or a modulation and coding scheme (MCS) of the data-modulated DMRSs.

Aspect 4: The method of any of Aspects 1-3, further comprising: transmitting an indication of a modulation and coding scheme (MCS) of the resources allocated for data-modulated DMRS; or receiving an indication of the MCS of the resources allocated for the data-modulated DMRSs Aspect 5: The method of Aspect 4, comprising transmitting the indication of the MCS with an indication that the communication is to be transmitted with the data-modulated DMRSs, or comprising receiving the indication of the MCS with an indication that the communication is to be transmitted with the data-modulated DMRSs.

Aspect 6: The method of Aspect 5, wherein the indication of the MCS indicates a difference between the MCS of the resources allocated for the data-modulated DMRSs and an MCS of the resources allocated for only data of the communication.

Aspect 7: The method of any of Aspects 1-3, further comprising determining a modulation and coding scheme (MCS) of the resources allocated for the data-modulated DMRSs based at least in part on one or more of: a configured MCS of the data-modulated DMRSs; or a configured difference of the MCS of the data-modulated DMRSs and an MCS of data of the communication.

Aspect 8: The method of any of Aspects 1-7, wherein a modulation and coding scheme (MCS) of the data-modulated DMRSs is lower than an MCS of data of the communication.

Aspect 9: The method of any of Aspects 1-8, further comprising mapping an additional code block to additional resources, of the physical shared channel, that are allocated for the data-modulated DMRSs.

Aspect 10: The method of any of Aspects 1-9, further comprising: determining one or more of a quantity of the resources or a pattern of the data-modulated DMRSs based at least in part on receiving one or more of configuration information, downlink control information (DCI), radio resource control (RRC) signaling, or one or more medium access control control elements (MAC CEs); or indicating one or more of the quantity of the resources or the pattern of the data-modulated DMRSs via one or more of configuration information, DCI, RRC signaling, or one or more MAC CEs.

Aspect 11: The method of any of Aspects 1-10, further comprising mapping the code block to a code block group that does not include any code blocks that are mapped to resources, of the physical shared channel, that are allocated for only data.

Aspect 12: The method of any of Aspects 1-11, further comprising: receiving hybrid automatic repeat request (HARD) feedback for the code block group; and transmitting, based at least in part on receiving negative acknowledgement (NACK) feedback for the code block group, a retransmission of the data-modulated DMRSs in a subsequent retransmission of the communication, or transmitting, based at least in part on receiving acknowledgement (ACK) feedback for the code block group, a subsequent retransmission of the communication with DMRSs that are not data-modulated.

Aspect 13: The method of any of Aspects 1-11, further comprising transmitting a retransmission of the data-modulated DMRSs in a subsequent retransmission of the communication based at least in part on: receiving negative acknowledgement (NACK) feedback for at least one code block group that is mapped to resources, of the physical shared channel, that are allocated for only data, receiving NACK feedback for a quantity of code block groups that are mapped to resources, of the physical shared channel, that are allocated for only data, the quantity satisfying a threshold, or receiving NACK feedback for all code block groups that are mapped to resources, of the physical shared channel, that are allocated for only data.

Aspect 14: A method of wireless communication performed by a wireless communication device, comprising: determining a mapping of a code block to resources, of a physical shared channel, that are allocated for data-modulated demodulation reference signals (DMRSs) in which each of the resources carries both at least a portion of a DMRS sequence and data; and receiving a communication, via the physical shared channel, that includes the code block that is mapped to the resources that are allocated for the data-modulated DMRSs.

Aspect 15: The method of Aspect 14, further comprising: performing a first stage channel estimation for the communication based at least in part on one or more DMRSs of the communication that are not data-modulated; performing channel decoding of the code block that is mapped to the resources, of the physical shared channel, that are allocated for the data-modulated DMRSs; performing, based at least in part on successful channel decoding of the code block, second stage channel estimation for the physical shared channel based at least in part on a reconstruction of the resources, of the physical shared channel, that are allocated for the data-modulated DMRSs; and decoding the communication based at least in part on the second stage channel estimation.

Aspect 16: The method of any of Aspects 14-15, further comprising: performing a first stage channel estimation for the communication based at least in part on one or more DMRSs of the communication that are not data-modulated; performing channel decoding of the code block that is mapped to the resources, of the physical shared channel, that are allocated for the data-modulated DMRSs; and decoding, based at least in part on unsuccessful channel decoding of the code block, a transmission based at least in part on the first stage channel estimation.

Aspect 17: The method of any of Aspects 14-16, further comprising: transmitting a request to map the code block to the resources that are allocated for the data-modulated DMRSs; or receiving an indication that the resources that are allocated for the data-modulated DMRSs are mapped to the code block.

Aspect 18: The method of any of Aspects 14-17, wherein the code block has a size that is different from a size of one or more code blocks that are mapped to resources, of the physical shared channel, that are allocated for only data, and wherein the size of the code block is based at least in part on one or more of: a quantity of the resources that are allocated for the data-modulated DMRSs, or a modulation and coding scheme (MCS) of the data-modulated DMRSs.

Aspect 19: The method of any of Aspects 14-18, further comprising: transmitting an indication of a modulation and coding scheme (MCS) of the resources allocated for data-modulated DMRS; or receiving an indication of the MCS of the resources allocated for the data-modulated DMRSs.

Aspect 20: The method of Aspect 19, comprising transmitting the indication of the MCS with an indication that the communication is to be transmitted with the data-modulated DMRSs, or comprising receiving the indication of the MCS with an indication that the communication is to be transmitted with the data-modulated DMRSs.

Aspect 21: The method of Aspect 20, wherein the indication of the MCS indicates a difference between the MCS of the resources allocated for the data-modulated DMRSs and an MCS of the resources allocated for only data of the communication.

Aspect 22: The method of any of Aspects 14-18, further comprising determining a modulation and coding scheme (MCS) of the resources allocated for the data-modulated DMRSs based at least in part on one or more of: a configured MCS of the data-modulated DMRSs, or a configured difference of the MCS of the data-modulated DMRSs and an MCS of data of the communication.

Aspect 23: The method of any of Aspects 14-22, further comprising determining a mapping of an additional code block to additional resources, of the physical shared channel, that are allocated for the data-modulated DMRSs.

Aspect 24: The method of any of Aspects 14-23, further comprising mapping the code block to a code block group that does not include any code blocks that are mapped to resources, of the physical shared channel, that are allocated for only data.

Aspect 25: The method of Aspect 24, further comprising: transmitting hybrid automatic repeat request (HARD) feedback for the code block group; and receiving, based at least in part on transmitting negative acknowledgement (NACK) feedback for the code block group, a retransmission of the data-modulated DMRSs in a subsequent retransmission of the communication, or receiving, based at least in part on transmitting acknowledgement (ACK) feedback for the code block group, a subsequent retransmission of the communication with DMRSs that are not data-modulated.

Aspect 26: The method of Aspect 24, further comprising receiving a retransmission of the data-modulated DMRSs in a subsequent retransmission of the communication based at least in part on: transmitting negative acknowledgement (NACK) feedback for at least one code block group that is mapped to resources, of the physical shared channel, that are allocated for only data, transmitting NACK feedback for a quantity of code block groups that are mapped to resources, of the physical shared channel, that are allocated for only data, the quantity satisfying a threshold, or transmitting NACK feedback for all code block groups that are mapped to resources, of the physical shared channel, that are allocated for only data.

Aspect 27: An apparatus for wireless communication at a device, comprising a processor; memory coupled with the processor; and instructions stored in the memory and executable by the processor to cause the apparatus to perform the method of one or more Aspects of Aspects 1-26.

Aspect 28: A device for wireless communication, comprising a memory and one or more processors coupled to the memory, the memory and the one or more processors configured to perform the method of one or more Aspects of Aspects 1-26.

Aspect 29: An apparatus for wireless communication, comprising at least one means for performing the method of one or more Aspects of Aspects 1-26.

Aspect 30: A non-transitory computer-readable medium storing code for wireless communication, the code comprising instructions executable by a processor to perform the method of one or more Aspects of Aspects 1-26.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A wireless communication device for wireless communication, comprising:
   one or more memories; and
   one or more processors, coupled to the one or more memories, configured to:
   map a code block to a first set of resource elements of a physical shared channel, wherein the first set of resource elements comprises resources allocated for data-modulated demodulation reference signals (DMRSs), and wherein the physical shared channel includes a second set of resource elements allocated for only data;
   determine a first modulation and coding scheme (MCS) based at least in part on one or more of:
   a configured MCS of the data-modulated DMRSs, or
   a configured difference between the first MCS and a second MCS; and
   transmit a communication, via the physical shared channel, that includes the code block, wherein the first MCS of the first set of resource elements is different from the second MCS of the second set of resource elements.

2. The wireless communication device of claim 1, wherein the one or more processors are further configured to one or more of:
   receive a request to map the code block to the first set of resource elements; or
   transmit an indication that the first set of resource elements are mapped to the code block.

3. The wireless communication device of claim 1, wherein the code block has a size that is different than a size of one or more code blocks that are mapped to the second set of resource elements, and wherein the size of the code block is based at least in part on one or more of:
  a quantity of resource elements of the first set of resource elements, or
  the first MCS.

4. The wireless communication device of claim 1, wherein the one or more processors are further configured to:
  transmit an indication of the first MCS; or
  receive an indication of the first MCS.

5. The wireless communication device of claim 4, wherein the one or more processors, to transmit the indication of the first MCS, are configured to transmit the indication of the first MCS with an indication that the communication is to be transmitted with the data-modulated DMRSs, or
  wherein the one or more processors, to receive the indication of the first MCS, are configured to receive the indication of the first MCS with an indication that the communication is to be transmitted with the data-modulated DMRSs.

6. The wireless communication device of claim 5, wherein the indication of the first MCS indicates a difference between the first MCS and the second MCS.

7. The wireless communication device of claim 1, wherein the first MCS is lower than the second MCS.

8. The wireless communication device of claim 1, wherein the one or more processors are further configured to map an additional code block to additional resources, of the physical shared channel, that are allocated for the data-modulated DMRSs.

9. The wireless communication device of claim 1, wherein the one or more processors are further configured to one or more of:
  determine one or more of a quantity of resource elements of the first set of resource elements or a pattern of the data-modulated DMRSs based at least in part on receiving one or more of configuration information, downlink control information (DCI), radio resource control (RRC) signaling, or one or more medium access control control elements (MAC CEs); or
  indicate one or more of the quantity or the pattern of the data-modulated DMRSs via one or more of configuration information, DCI, RRC signaling, or one or more MAC CEs.

10. The wireless communication device of claim 1, wherein the one or more processors are further configured to map the code block to a code block group that does not include any code blocks that are mapped to the second set of resource elements.

11. The wireless communication device of claim 1, wherein the one or more processors are further configured to:
  receive hybrid automatic repeat request (HARQ) feedback for a code block group; and
  transmit, based at least in part on receiving negative acknowledgement (NACK) feedback for the code block group, a retransmission of the data-modulated DMRSs in a subsequent retransmission of the communication, or
  transmit, based at least in part on receiving acknowledgement (ACK) feedback for the code block group, a subsequent retransmission of the communication with DMRSs that are not data-modulated.

12. The wireless communication device of claim 1, wherein the one or more processors are further configured to transmit a retransmission of the data-modulated DMRSs in a subsequent retransmission of the communication based at least in part on:
  receiving negative acknowledgement (NACK) feedback for at least one code block group that is mapped to the second set of resource elements,
  receiving NACK feedback for a quantity of code block groups that are mapped to the second set of resource elements, the quantity satisfying a threshold, or
  receiving NACK feedback for all code block groups that are mapped to the second set of resource elements.

13. A wireless communication device for wireless communication, comprising:
  one or more memories; and
  one or more processors, coupled to the one or more memories, configured to:
  determine a mapping of a code block to a first set of resource elements of a physical shared channel, wherein the first set of resource elements comprises resources allocated for data-modulated demodulation reference signals (DMRSs), and wherein the physical shared channel includes a second set of resource elements allocated for only data;
  determine a first modulation and coding scheme (MCS) based at least in part on one or more of:
    a configured MCS of the data-modulated DMRSs, or
    a configured difference of the first MCS and a second MCS; and
  receive a communication, via the physical shared channel, that includes the code block, wherein the first MCS of the first set of resource elements is different from the second MCS of the second set of resource elements.

14. The wireless communication device of claim 13, wherein the one or more processors are further configured to:
  perform a first stage channel estimation for the communication based at least in part on one or more DMRSs of the communication that are not data-modulated;
  perform channel decoding of the code block that is mapped to the first set of resource elements;
  perform, based at least in part on successful channel decoding of the code block, second stage channel estimation for the physical shared channel based at least in part on a reconstruction of the first set of resource elements; and
  decode the communication based at least in part on the second stage channel estimation.

15. The wireless communication device of claim 13, wherein the one or more processors are further configured to:
  perform a first stage channel estimation for the communication based at least in part on one or more DMRSs of the communication that are not data-modulated;
  perform channel decoding of the code block that is mapped to the first set of resource elements; and
  decode, based at least in part on unsuccessful channel decoding of the code block, a transmission based at least in part on the first stage channel estimation.

16. The wireless communication device of claim 13, wherein the one or more processors are further configured to one or more of:
  transmit a request to map the code block to the first set of resource elements; or
  receive an indication that the first set of resource elements are mapped to the code block.

17. The wireless communication device of claim 13, wherein the code block has a size that is different from a size of one or more code blocks that are mapped to the second set of resource elements, and
wherein the size of the code block is based at least in part on one or more of:
a quantity of resource elements of the first set of resource elements, or the first MCS.

18. The wireless communication device of claim 13, wherein the one or more processors are further configured to:
transmit an indication of the first MCS; or
receive an indication of the first MCS.

19. The wireless communication device of claim 18, wherein the one or more processors, to transmit the indication of the first MCS, are configured to transmit the indication of the first MCS with an indication that the communication is to be transmitted with data-modulated DMRSs, or
wherein the one or more processors, to receive the indication of the first MCS, are configured to receive the indication of the first MCS with an indication that the communication is to be transmitted with data-modulated DMRSs.

20. The wireless communication device of claim 19, wherein the indication of the first MCS indicates a difference between the first MCS and the second MCS.

21. The wireless communication device of claim 13, wherein the one or more processors are further configured to determine a mapping of an additional code block to additional resources, of the physical shared channel, that are allocated for the data-modulated DMRSs.

22. The wireless communication device of claim 13, wherein the one or more processors are further configured to map the code block to a code block group that does not include any code blocks that are mapped to the second set of resource elements.

23. The wireless communication device of claim 13, wherein the one or more processors are further configured to:
transmit hybrid automatic repeat request (HARQ) feedback for a code block group; and
receive, based at least in part on transmitting negative acknowledgement (NACK) feedback for the code block group, a retransmission of the data-modulated DMRSs in a subsequent retransmission of the communication, or
receive, based at least in part on transmitting acknowledgement (ACK) feedback for the code block group, a subsequent retransmission of the communication with DMRSs that are not data-modulated.

24. The wireless communication device of claim 13, wherein the one or more processors are further configured to receive a retransmission of the data-modulated DMRSs in a subsequent retransmission of the communication based at least in part on:
transmitting negative acknowledgement (NACK) feedback for at least one code block group that is mapped to the second set of resource elements,
transmitting NACK feedback for a quantity of code block groups that are mapped to the second set of resource elements, the quantity satisfying a threshold, or
transmitting NACK feedback for all code block groups that are mapped to the second set of resource elements.

25. A method of wireless communication performed by a wireless communication device, comprising:
mapping a code block to a first set of resource elements of a physical shared channel, wherein the first set of resource elements comprises resources allocated for data-modulated demodulation reference signals (DMRSs), and wherein the physical shared channel includes a second set of resource elements allocated for only data;
determining a first modulation and coding scheme (MCS) based at least in part on one or more of:
a configured MCS of the data-modulated DMRSs, or
a configured difference of the first MCS and a second MCS; and
transmitting a communication, via the physical shared channel, that includes the code block, wherein the first MCS of the first set of resource elements is different from the second MCS of the second set of resource elements.

26. The method of claim 25, further comprising mapping the code block to a code block group that does not include any code blocks that are mapped to the second set of resource elements.

27. A method of wireless communication performed by a wireless communication device, comprising:
determining a mapping of a code block to a first set of resource elements of a physical shared channel, wherein the first set of resource elements comprises resources allocated for data-modulated demodulation reference signals (DMRSs), and wherein the physical shared channel includes a second set of resource elements allocated for only data;
determining a first modulation and coding scheme (MCS) based at least in part on one or more of:
a configured MCS of the data-modulated DMRSs, or
a configured difference of the first MCS and a second MCS; and
receiving a communication, via the physical shared channel, that includes the code block, wherein the first MCS of the first set of resource elements is different from the second MCS of the second set of resource elements.

28. The method of claim 27, further comprising mapping the code block to a code block group that does not include any code blocks that are mapped to the second set of resource elements.

* * * * *